(12) United States Patent
Miltenberg

(10) Patent No.: US 11,079,740 B1
(45) Date of Patent: Aug. 3, 2021

(54) PROCESSES FOR PRODUCING 3D-APPEARING SELF-ILLUMINATING HIGH DEFINITION PHOTOLUMINESCENT AND TRANSLUCENT LITHOPHANE, A QUASI-COLOR PROCESS FOR PRODUCING QUASI-COLOR PHOTOLUMINESCENT AND TRANSLUCENT LITHOPHANE, AND AN AUTHENTICITY CHIP PROCESS FOR CREATING AN AUTHENTICITY CHIP LITHOPHANE

(71) Applicant: Ross Leigh Miltenberg, Burbank, CA (US)

(72) Inventor: Ross Leigh Miltenberg, Burbank, CA (US)

( * ) Notice: Subject to any disclaimer, the term of this patent is extended or adjusted under 35 U.S.C. 154(b) by 126 days.

(21) Appl. No.: 16/503,275

(22) Filed: Jul. 3, 2019

Related U.S. Application Data

(60) Provisional application No. 62/727,392, filed on Sep. 5, 2018, provisional application No. 62/693,679, filed on Jul. 3, 2018.

(51) Int. Cl.
*G05B 19/4099* (2006.01)

(52) U.S. Cl.
CPC .............. *G05B 19/4099* (2013.01); *G05B 2219/49007* (2013.01)

(58) Field of Classification Search
None
See application file for complete search history.

(56) References Cited

U.S. PATENT DOCUMENTS

2015/0251357 A1* 9/2015 Jin .................. G05B 15/02
700/119
2019/0389243 A1* 12/2019 Taylor ............... B29C 64/386

* cited by examiner

*Primary Examiner* — Mohammad Ali
*Assistant Examiner* — Saad M Kabir
(74) *Attorney, Agent, or Firm* — Plager Schack LLP; Mark H. Plager; Stephen Hallberg

(57) ABSTRACT

Processes are disclosed for producing 3D-appearing self-illuminating high definition photoluminescent lithophane of a digitized picture in which the photoluminescent lithophane provides a glow-in-the-dark quality of the digitized picture, and an authenticity chip lithophane is produced. The processes for producing 3D-appearing self-illuminating high definition photoluminescent lithophane of a digitized picture include a monochrome process for producing 3D-appearing self-illuminating high definition photoluminescent lithophane that results in 3D-appearing high definition monochrome glow in the dark prints of digitized pictures and a full color process for producing 3D-appearing self-illuminating high definition photoluminescent lithophane that results in 3D-appearing high definition full color glow in the dark prints of digitized pictures. A luminance pump is employed in the full color process for producing 3D-appearing self-illuminating high definition photoluminescent lithophane to pump light through the rest of the plates and bring the overall brightness up.

6 Claims, 17 Drawing Sheets

PROCESSES FOR PRODUCING 3D-APPEARING SELF-ILLUMINATING HIGH DEFINITION PHOTOLUMINESCENT AND TRANSLUCENT LITHOPHANE, A QUASI-COLOR PROCESS FOR PRODUCING QUASI-COLOR PHOTOLUMINESCENT AND TRANSLUCENT LITHOPHANE, AND AN AUTHENTICITY CHIP PROCESS FOR CREATING AN AUTHENTICITY CHIP LITHOPHANE

CLAIM OF BENEFIT TO PRIOR APPLICATIONS

This application claims benefit to U.S. Provisional Patent Application 62/693,679, entitled "PROCESS FOR PRODUCING 3D-APPEARING SELF-ILLUMINATING HIGH DEFINITION PHOTOLUMINESCENT LITHOPHANE," filed Jul. 3, 2018, and to U.S. Provisional Patent Application 62/727,392, entitled "PROCESS FOR PRODUCING QUASI-COLOR PHOTOLUMINESCENT LITHOPHANE USING ONLY LUMINANCE INFORMATION OF A PICTURE," filed Sep. 5, 2018. The U.S. Provisional Patent Applications 62/693,679 and 62/727,392 are incorporated herein by reference.

BACKGROUND

Embodiments of the invention described in this specification relate generally to producing recreations of digitized photos, and more particularly, to processes for producing 3D-appearing self-illuminating high definition photoluminescent lithophane of a digitized photo, processes for producing quasi-color photoluminescent and translucent lithophane using only luminance information of a digitized photo, an authenticity chip lithophane, and a process for creating an authenticity chip lithophane that provides a powerless light reactive alternate to electronic means of authenticating an object or entry ticket.

Conventional production of anything with detail made of glow in the dark plastics tends to obscure any definition. This is especially true of digital pictures and is not clearly viewable and/or is very flat in look. Unfortunately, the conventional methods presently used are unsuitable for producing high definition clarity because the glow in the dark plastics tend to obscure any detail built into what form is made with the light they emit. Yet, many people would like to have a way to produce high definition monochrome and full color glow in the dark prints of digitized pictures where details are brought into clear focus and present a three-dimensional (3D) quality or appearance to the digitized photo used.

Therefore, what is needed is a way to produce high definition and contrast at anywhere from monochrome to full color glow in the dark lithophanes of digitized pictures where details are brought into clear focus and present a 3D quality to the digitized photo used. Also conventional lithophanes have always been monolithic in material and therefore always of low contrast and can usually only be seen by strong light transmission through the rear of the created lithophane of which also detail is very low.

Also, lithophanes have always been made from a single monolithic substance such as wood, glass, porcelain, plastic, etc which produces a lithophane that has low contrast and is a faint monochrome of the color of the singular substance used. In producing a self-illuminating high definition and contrast photo luminescence and translucent lithophane anywhere from monochrome to full color is dependent on how many layers of different colors of the substance, the different colors and their position and weight used to construct the lithophane.

In addition to the problems with conventional methods of producing high definition clarity of glow in the dark plastics, many people have monochrome pictures which they would like to have rendered in some form in color or quasi-color. However, monochrome pictures only include light (luminance) information, not color. Furthermore, photographs throughout the history of photography have been manipulated after exposure in many ways in order to produce desired images. For example, monochrome images have been manipulated with charcoal pencils or other darkening agents to obscure, hide, or de-emphasize various elements present in the exposed photo.

Also, photographs, no matter if monochrome or color, include luminance information that specify varying amounts of lightness and darkness in the photographs. However, luminance information can be erratic for photos that have been manipulated after exposure. Furthermore, people desire to see color representations of monochrome images, but unless they have altered the photo by some coloring process that is deemed historically accurate by confirmation through other color photos of the subject or people who can confirm, it is difficult to know which colors may be present. Yet, many people would like to have a way to produce a color representation of a monochrome photo which is both decently accurate and possible to produce without validation by historical or other means.

Therefore, many people would like to have a way to produce quasi-color photoluminescent and translucent lithophanes of digitized pictures using only luminance information from the digitized pictures and to identify manipulations in the digitized pictures based on the luminance information.

BRIEF DESCRIPTION

Novel processes are disclosed for producing three-dimensional (3D) self-illuminating high definition photoluminescent and phototranslucent lithophane of a digitized picture in which the photoluminescent lithophane provides a glow-in-the-dark quality of the digitized picture, a quasi-color process for producing quasi-color photoluminescent and translucent lithophane of a digitized picture using only luminance information from the digitized picture, an authenticity chip lithophane that provides a powerless light reactive alternate to electronic means of authenticating an object or entry ticket and an authenticity chip process for creating the authenticity chip lithophane. Depending on how many non monolithic in color materials are used the resulting process can produce anywhere from a 3D self-illuminating high definition photoluminescent and phototranslucent lithophane monochrome lithophane to full simulated color.

The processes for producing 3D-appearing self-illuminating high definition photoluminescent lithophane of a digitized picture include (i) a monochrome process for producing 3D-appearing self-illuminating high definition photoluminescent lithophane that results in 3D-appearing high definition monochrome glow in the dark prints of digitized pictures and (ii) a full color process for producing 3D-appearing self-illuminating high definition photoluminescent lithophane that results in 3D-appearing high definition full color glow in the dark prints of digitized pictures.

In some embodiments, the monochrome process for producing 3D-appearing self-illuminating high definition photoluminescent lithophane creates a luminance separation of a digitized monochrome or full color picture and assigns the lights to a strong glow in the dark color, such as green, and the darks to a weaker glow in the dark color, such as blue, to show all the definition of the digitized picture in complete darkness and enhance it to give it a 3D look.

In some embodiments, the non monolithic process (in this case monochrome using only two different colors) for producing 3D-appearing self-illuminating high definition photoluminescent and phototranslucent lithophane creates a luminance separation of a digitized monochrome picture and assigns the lights to a strong glow in the dark color, such as green, and the darks to a weaker glow in the dark color, such as blue, to show all the definition of the digitized picture in complete darkness and enhance it to give it a 3D look. This can be increased to multiple colors in which if the quasi-color formula is used a simulated full color lithophane can be created.

In some embodiments, the full color process for producing 3D-appearing self-illuminating high definition photoluminescent lithophane creates three distinct color separation layers and a luminance separation of a digitized full color picture. In some embodiments, the three distinct color separation layers include a red separation layer, a green separation layer, and a blue separation layer. In some embodiments, the full color process for producing 3D-appearing self-illuminating high definition photoluminescent lithophane assigns the lights to a strong glow in the dark color for the luminance separation and the darks to a weaker glow in the dark color for the luminance separation to show all the definition of the digitized picture in complete darkness and enhance it to give it a 3D look. In some embodiments, the luminance separation is printed to a transparent layer, such as a transparent piece of plastic, that is used as a luminance mask. In some embodiments, the full color process for producing 3D-appearing self-illuminating high definition photoluminescent lithophane combines the luminance mask with the red, green, and blue separation layers to produce the 3D-appearing self-illuminating high definition full color photoluminescent lithophane of the digitized picture.

In some embodiments, a luminance pump is employed in the full color process for producing 3D-appearing self-illuminating high definition photoluminescent lithophane to pump light through the rest of the plates and increase overall brightness.

A quasi-color process for producing quasi-color photoluminescent and translucent lithophane of a digitized picture using only luminance information from the digitized picture is disclosed. The quasi-color process for producing quasi-color photoluminescent and translucent lithophane of a digitized picture using only luminance information from the digitized picture includes steps comprising inputting a digitized photo, using a 3D modeling program to dark extrude the photo according to luminance information, saving the dark extrusion as a 3D model ("STL object"), configuring printing parameters of the dark extrusion 3D model via a 3D printing slicer program and outputting a 3D printer code ("gcode") file in response to the configured printing parameters for a printing by a 3D printer, updating the gcode file during material post processing stage that sets set lithophane color heights to create the quasi-color effect, and using the updated gcode file by the 3D printer to produce the quasi-color photoluminescent and translucent lithophane.

In some embodiments, the quasi-color process for producing quasi-color photoluminescent and translucent lithophane of a digitized picture using only luminance information from the digitized picture reveals manipulations made to a physical photo on which the digitized picture is based. In some embodiments, the manipulations revealed include post-exposure use of charcoal pencil to manipulate an appearance of the physical photo.

An authenticity chip lithophane and an authenticity chip process for creating the authenticity chip lithophane are disclosed. In some embodiments, the authenticity chip lithophane provides a powerless light reactive alternate to electronic means of authenticating an object or entry ticket.

In some embodiments, the authenticity chip process for creating an authenticity chip lithophane comprises (i) inputting a digitized photo, (ii) loading the digitized photo into a photo manipulation program and adding a white rim that forms solid side walls, (iii) performing a sequence of actions in a 3D modeling program including extruding the digital image with light luminance information to create a bottom layer of the authenticity chip lithophane, copying the extruded digital image and pasting it next to the original in a canvas work space within the 3D modeling program, mirroring the copied image to match with the base and to externally complete a smooth box, merging the two into a single authenticity chip 3D modeling program object ("STL object"), and then saving the new 3D model authenticity chip, (iv) in a 3D printing slicer program, loading the authenticity chip STL object, setting it up for printing, and saving a 3D printer code file (a "geode" file) to thereafter put into the 3D slicer program for post processing and setting up color changes that complete preparation actions in service of creating the authenticity chip as a physical authenticity chip lithophane, and (v) outputting the authenticity chip lithophane by way of a 3D printer.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, but which are included to provide a further understanding of the present disclosure, are incorporated in and constitute a part of this specification, illustrate aspects of the present disclosure, and together with the detailed description serve to explain the principles of the present disclosure. No attempt is made to show structural details of the present disclosure in more detail than may be necessary for a fundamental understanding of the present disclosure and the various ways in which it may be practiced. In the drawings.

DETAILED DESCRIPTION

Figure 1:
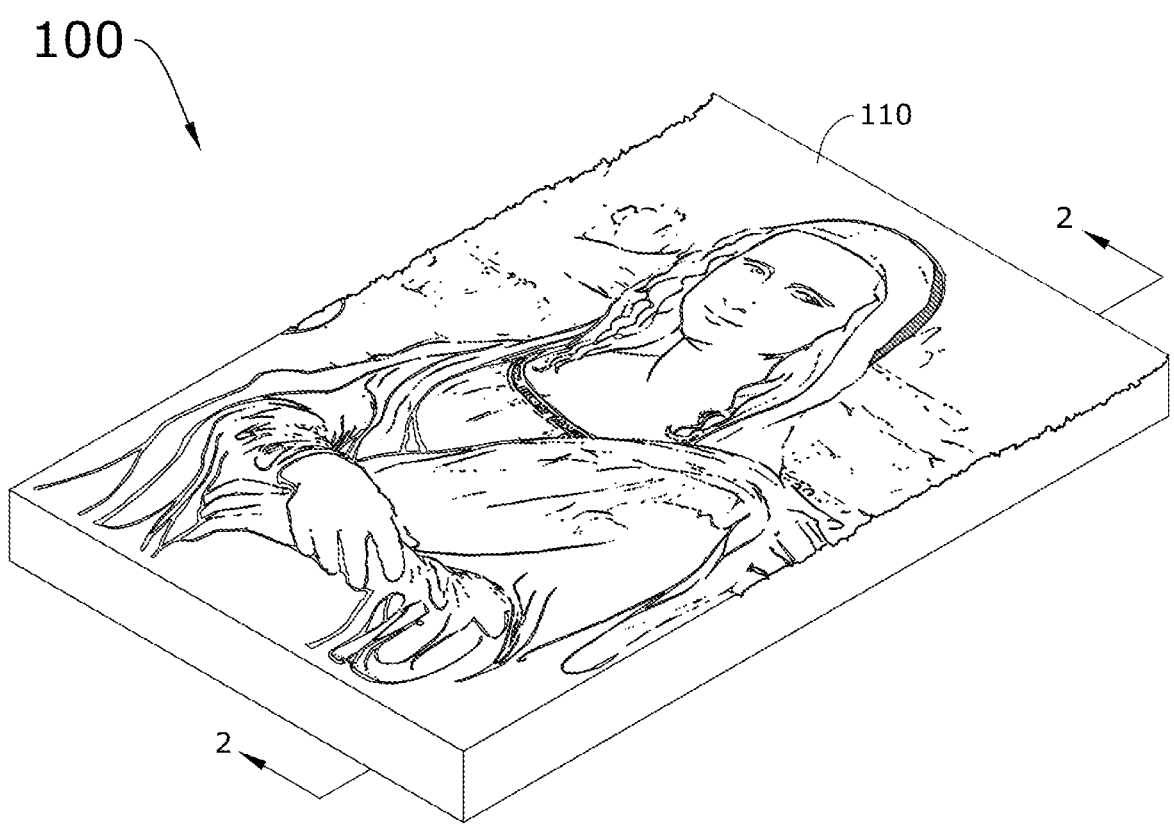
FIG. 1 conceptually illustrates a perspective view of a non monolithic and non homogeneous lithophane with below the side sectional views of two, three, and four layer versions of these lithophanes in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include novel processes for producing three-dimensional (3D) self-illuminating high definition photoluminescent and phototranslucent lithophane of a digitized picture in which the photoluminescent lithophane provides a glow-in-the-dark quality of the digitized picture, a quasi-color process for producing quasi-color photoluminescent and translucent lithophane of a digitized picture using only luminance information from the digitized picture, an authenticity chip lithophane that provides a powerless light reactive alternate to electronic means of authenticating an object or entry ticket and an authenticity chip process for creating the authenticity chip lithophane. Depending on how many non monolithic in color materials are used the resulting process can produce anywhere from a 3D self-illuminating high definition photoluminescent and phototranslucent lithophane monochrome lithophane to full simulated color.

Some embodiments include processes for producing 3D-appearing self-illuminating high definition photoluminescent lithophane of a digitized picture in which the photoluminescent lithophane provides a glow-in-the-dark quality of the digitized picture. The processes for producing 3D-appearing self-illuminating high definition photoluminescent lithophane of a digitized picture include (i) a monochrome to full simulated color process for producing 3D-appearing self-illuminating high definition and contrast photoluminescent and translucent lithophane that results in 3D-appearing high definition monochrome glow in the dark prints of digitized pictures and (ii) a full color process for producing 3D-appearing self-illuminating high definition photoluminescent lithophane that results in 3D-appearing high definition full color glow in the dark prints of digitized pictures.

Embodiments of the processes for producing 3D-appearing self-illuminating high definition photoluminescent lithophane described in this specification differ from and improve upon currently existing options. In particular, some embodiments differ by producing a glow in the dark recreation of any digitized photo that can be seen in the dark (i.e., once charged with light), put under a backlight, or viewed while back lit by a strong light. Also, the processes for producing 3D-appearing self-illuminating high definition photoluminescent lithophane use an embossing procedure which gives a 3D quality to the digitized photo that has now been 3D printed in glow in the dark plastics.

In addition, some embodiments of the processes for producing 3D-appearing self-illuminating high definition photoluminescent lithophane improve upon the currently existing options because glow in the dark plastics can give off light, but existing conventional uses of such plastics presently obscure most details, making their present usage unsuitable for high definition needs. In contrast, details are brought into clear focus by performing one of the processes for producing 3D-appearing self-illuminating high definition photoluminescent lithophane of the present disclosure. Specifically, the processes for producing 3D-appearing self-illuminating high definition photoluminescent lithophane take a digitized photo and three-dimensionally print it out with high definition detail that is unique and adds a 3D quality or appearance to the digitized photo used, while also using luminance information in the product that is produced by both the monochrome and the full color processes and using color information in the product that is produced by way of (only) the full color process, so as to provide a glow-in-the-dark effect.

Some embodiments of the invention include a novel quasi-color process for producing quasi-color photoluminescent and translucent lithophane of a digitized picture using only luminance information from the digitized picture. In some embodiments, the quasi-color process for producing quasi-color photoluminescent and translucent lithophane of a digitized picture using only luminance information from the digitized picture includes (i) inputting a digitized photo, using a 3D modeling program to dark extrude the photo according to luminance information, (ii) saving the dark extrusion as a 3D model ("STL object"), (iii) configuring printing parameters of the dark extrusion 3D model via a 3D printing slicer program and outputting a 3D printer code file (a "geode" file) in response to the configured printing parameters for a printing by a 3D printer, (iv) updating the gcode file during a material post processing stage that sets lithophane color heights to create the quasi-color effect, and (v) using the updated gcode file by the 3D printer to produce the quasi-color photoluminescent and translucent lithophane.

In some embodiments, the quasi-color process for producing quasi-color photoluminescent and translucent lithophane of a digitized picture using only luminance information from the digitized picture reveals manipulations made to a physical photo on which the digitized picture is based. In some embodiments, the manipulations revealed include post-exposure use of charcoal pencil to manipulate an appearance of the physical photo.

Embodiments of the quasi-color process for producing quasi-color photoluminescent and translucent lithophane of a digitized picture using only luminance information from the digitized picture described in this specification differ from and improve upon currently existing options. In particular, some embodiments differ by producing a quasi-color recreation of a digitized photo based only on the luminance information of the digitized photo. In other words, the quasi-color process for producing quasi-color photoluminescent and translucent lithophane of a digitized picture using only luminance information from the digitized picture can use luminance information from a monochrome photo and produce a quasi-color representation of the photo in photoluminescent lithophane, which when charged under a backlight or viewed while back lit by a strong light presents an accurate appearing representation in color of the subject in the monochrome photo.

Some embodiments of the invention include a novel authenticity chip lithophane that provides a powerless light reactive alternate to electronic means of authenticating an object or entry ticket and a novel authenticity chip process for creating an authenticity chip lithophane.

In some embodiments, the authenticity chip process for creating an authenticity chip lithophane comprises (i) inputting a digitized photo, (ii) loading the digitized photo into a photo manipulation program and adding a white rim that forms solid side walls, (iii) performing a sequence of actions in a 3D modeling program including extruding the digital image with light luminance information to create a bottom layer of the authenticity chip lithophane, copying the extruded digital image and pasting it next to the original in a canvas work space within the 3D modeling program, mirroring the copied image to match with the base and to externally complete a smooth box, merging the two into a single authenticity chip 3D modeling program object ("STL object"), and then saving the new 3D model authenticity chip, (iv) in a 3D printing slicer program, loading the authenticity chip STL object, setting it up for printing, and saving a 3D printer code file (a "geode" file) to thereafter put into the 3D slicer program for post processing and setting up color changes that complete preparation actions in service of creating the authenticity chip as a physical authenticity chip lithophane, and (v) outputting the authenticity chip lithophane by way of a 3D printer.

In some embodiments, the white rim is added with a minimum 0.4 mm width so that when the digital image is extruded by the 3D modeling program the light luminance information forms solid side walls. In some embodiments, the 3D modeling program extrudes the digital image with light luminance information to have a 0.6 mm base at the bottom and 1.5 mm total height. In some embodiments, the authenticity chip STL object is configured to print top and bottom solid layers at 0.1 resolution and 90% fill. In some embodiments, the authenticity chip lithophane as printed is composed of a 0.2 mm white plastic, 0.4 mm glow green plastic, varied color plastic(s) from 0.6 mm to 1.2 mm, and clear black from 1.2 mm to 1.5 mm to create a top view area.

Several more detailed embodiments are described by reference to Figures in the sections below. Section I describes examples of non monolithic and non homogeneous lithophane and a processes for producing monochrome to full simulated color 3D-appearing self-illuminating high definition and contrast photoluminescent and translucent lithophane of a digitized picture by reference to FIGS. 1-4. Section II describes a full color process for producing 3D-appearing self-illuminating high definition photoluminescent lithophane and presents an exemplary full color lithophane by reference to FIGS. 6-10. Section III describes a quasi-color process for producing quasi-color photoluminescent and translucent lithophane using only luminance (light) information of a digitized photo by reference to FIGS. 11-16. Section IV describes some details of a luminance pump and aspects of identifying manipulations in a photo by way of the quasi-color process for producing quasi-color photoluminescent and translucent lithophane of a digitized photo. Section V describes aspects of an authenticity chip lithophane that provides a powerless light reactive alternative to electric means of authenticating an object or an entry ticket and an authenticity chip process for creating an authenticity chip lithophane by reference to FIGS. 17-23. Section VI describes an electronic system by reference to FIG. 24 which implements one or more embodiments of the invention.

I. Process for Producing Monochrome to Full Simulated Color 3D-Appearing Self-Illuminating High Definition and Contrast Photoluminescent and Translucent Lithophane In some embodiments, the monochrome to full simulated color process for producing 3D-appearing self-illuminating high definition and contrast photoluminescent and translucent lithophane creates a luminance separation of a digitized monochrome or full color picture and assigns the lights to a strong glow in the dark color, such as green, and the darks to a weaker glow in the dark color, such as blue (for monochrome), to show all the definition of the digitized picture in complete darkness and enhance it to give it a 3D look. The luminance separation is a singular separation for a monochrome picture, and up to seven separations of luminance for full simulated color.

By way of example, FIG. 1 conceptually illustrates a perspective view of a non monolithic and non homogeneous lithophane 100. As shown in this figure, the non monolithic and non homogeneous lithophane 100 presents an image of a person 110. In addition, 3D texture is visible along some of the sides of the non monolithic and non homogeneous lithophane 100.

Figure 2:
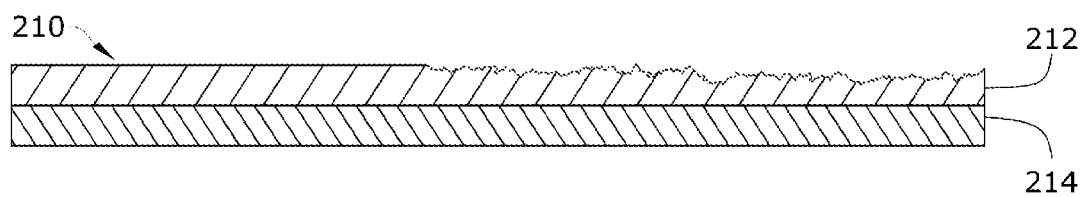
FIG. 2 conceptually illustrates a section view taken along line 2-2 of the non monolithic and non homogeneous lithophane with exemplary views of two, three, and four layer versions of the non monolithic and non homogeneous lithophane in some embodiments.
Figure 2:
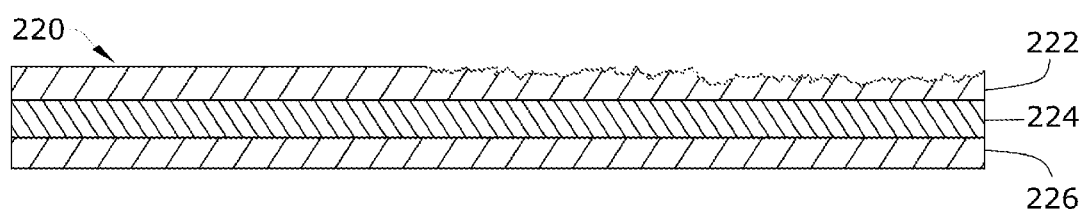
Figure 2:
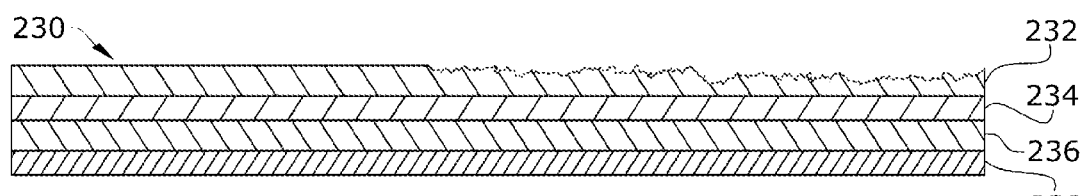

Now turning to another example, FIG. 2 conceptually illustrates a section view taken along line 2-2 of the non monolithic and non homogeneous lithophane 100 with exemplary views of two, three, and four layer versions of the non monolithic and non homogeneous lithophane 100. Specifically, the two layer version 210 includes a top layer 212 and a bottom layer 214. The bottom layer 214 of the two layer version 210 of the non monolithic and non homogeneous lithophane 100 is a base layer and is the lightest layer, while the top layer 212 shows the texture of the lithophane's three dimensional structure, and includes the darkest information of the lithophane. The two layer version 210 of the non monolithic and non homogeneous lithophane 100 is a monochrome lithophane in some embodiments. By contrast, the exemplary the three layer version 220 includes a top layer 222, a middle layer 224, and a bottom layer 226, with the bottom layer 226 being the base layer with the lightest information, and the middle layer 224 stacked atop the base bottom layer 226 and being darker than the base bottom layer 226, and finally, the top layer 222 resting above the full stack with the lightest information and showing the 3D texture of the lithophane. The last exemplary version shown in this figure is the four layer version 230, which includes a top first layer 232 for the darkest layer and showing the 3D texture, a second layer 234 stacked beneath the top first layer 232 with slightly lighter information, a third layer 236 below the second layer 234 with even lighter information, and a bottom fourth layer 238, which is the base layer with the lightest information.

Figure 3:
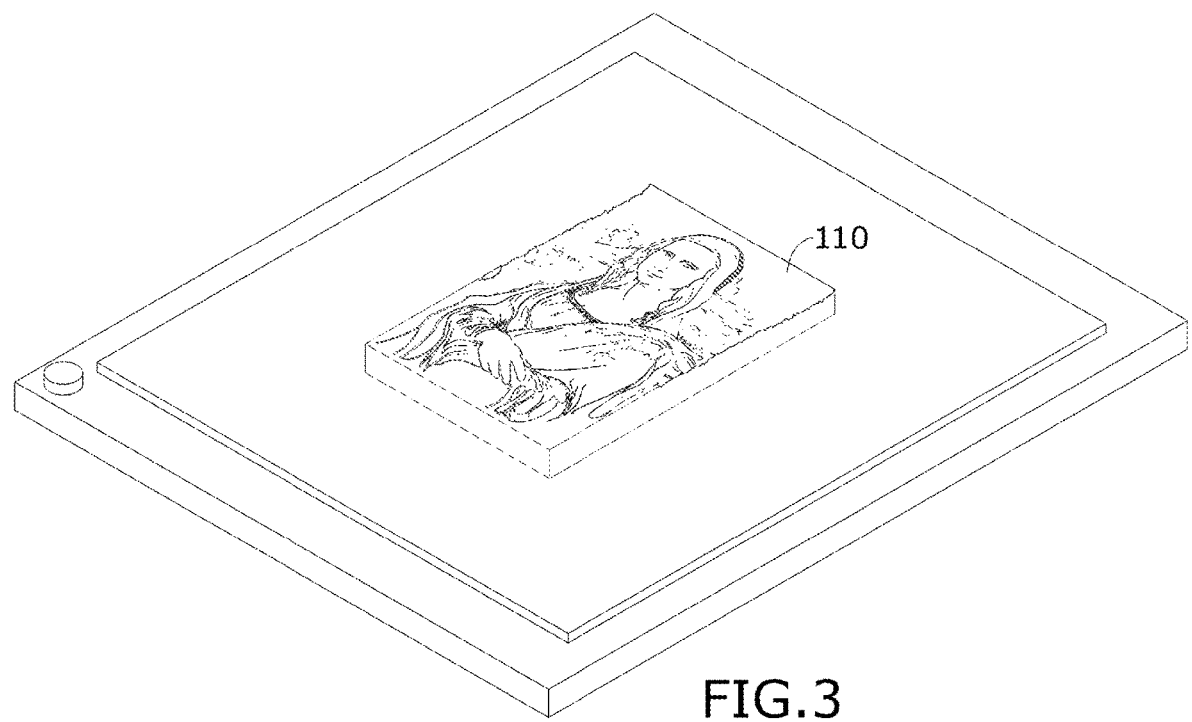
FIG. 3 conceptually illustrates a perspective view of a non monolithic and non homogeneous lithophane on a LED light panel as one means of viewing the lithophane in some embodiments.

In another example, FIG. 3 conceptually illustrates a perspective view of the non monolithic and non homogeneous lithophane 100 displayed on a LED light panel as one means of viewing the image of the person 110 as the light from the LED light panel shines through the non monolithic and non homogeneous lithophane 100.

Figure 4:
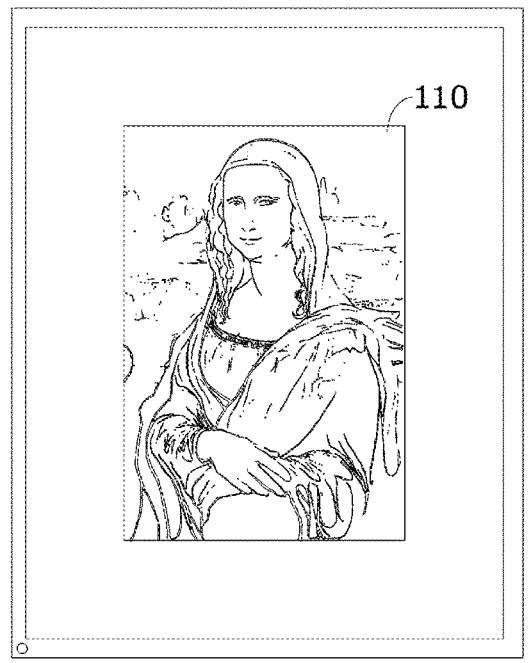
FIG. 4 conceptually illustrates a front view of the non monolithic and non homogeneous lithophane of FIG. 3, as shown on the LED light panel for viewing the lithophane.

Similarly, FIG. 4 conceptually illustrates a front view of the non monolithic and non homogeneous lithophane of FIG. 3, as shown on the LED light panel for viewing the image of the person 110 as the light from the LED light panel shines through the non monolithic and non homogeneous lithophane 100.

The monochrome to full simulated color process for producing 3D-appearing self-illuminating high definition and contrast photoluminescent and translucent lithophane of the present disclosure may be comprised of the following elements. This list of possible constituent elements is intended to be exemplary only and it is not intended that this list be used to limit the monochrome to full simulated color process for producing 3D-appearing self-illuminating high definition and contrast photoluminescent and translucent lithophane of the present application to just these elements. Persons having ordinary skill in the art relevant to the present disclosure may understand there to be equivalent elements that may be substituted within the present disclosure without changing the essential function or operation of the monochrome to full simulated color process for producing 3D-appearing self-illuminating high definition and contrast photoluminescent and translucent lithophane.

1. Emboss digitized photo using the darks (luminance) to extrude the photo according to strength in a 3D modeling program (lights are not raised at all).

2. Cut the 3D model of the embossed 3D photo into two parts, or into three or more for more color depth all the way to full simulated color, according to the height created by embossing the digitized photo separating the darks from the lights (luminance) in the photo and saving the top (darks) and bottom (lights) of 3D emboss of the digitized photo as separate 3D object files but in the same positions they were in so they can be reassembled by the 3D slicer program. An alternative method uses a post slicer gcode processor program to select what heights to change the material instead of having to slice it in the 3D modeler program.

3. Put the two 3D objects into the slicer program to create a slicer file which will use a strong glow in the dark plastic (e.g., green) for the base of the picture (which includes the light luminance information) and a weak glow in the dark plastic (e.g., blue) for the top (which has the dark luminance information) assigned in order for the 3D printer to assemble the 3D print properly. If using the alternate method of just assigning layers after the slicer program then just the original unbroken embossed 3D photo is processed in the slicer program with the necessary printing parameters, then the gcode file generated is moved to the post slicer gcode program and the material height changes assigned and then rendered out for use in the 3D printer.

4. Load a dual extruder 3D printer with a strong glow in the dark plastic (e.g., green) for the base printing and a weak glow in the dark color (e.g., blue) for the top half of the 3D print dark luminance information and print the glow in the dark high definition digitized photo with 3D look or appearance. Alternatively the post processed gcode with assigned heights is used in a single extruder 3D printer where the first color is loaded and as printing progresses the material color is changed where it was assigned till the 3D-appearing self-illuminating high definition and contrast photoluminescent and translucent lithophane has been completed.

Figure 5:
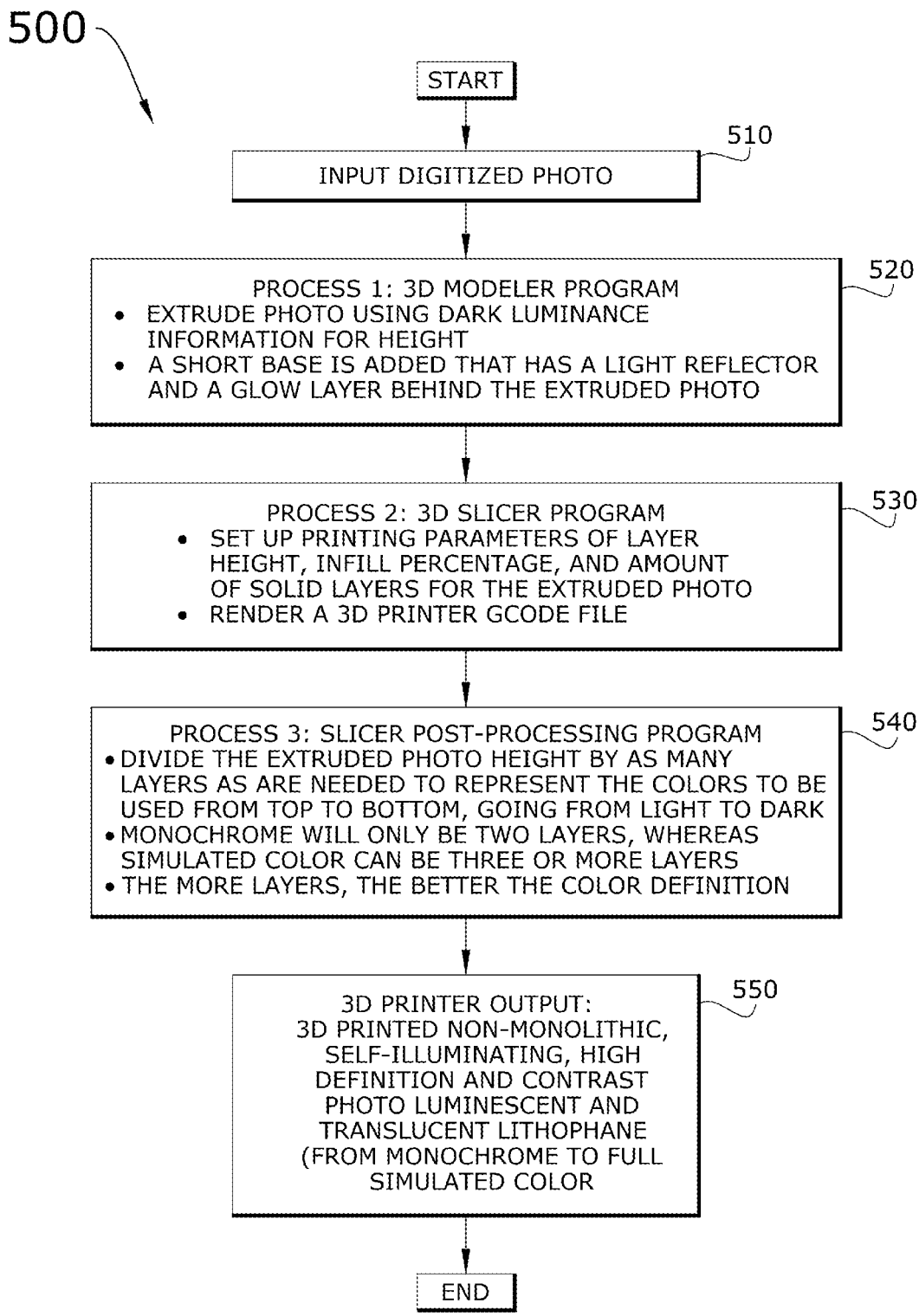
FIG. 5 conceptually illustrates a process for producing a non-monolithic self-illuminating high definition and contrast photo luminescent and translucent lithophane in some embodiments.

By way of example, FIG. 5 conceptually illustrates a monochrome to full simulated color process for producing 3D-appearing self-illuminating high definition and contrast photoluminescent and translucent lithophane 500. As shown in this figure, the monochrome to full simulated color process for producing 3D-appearing self-illuminating high definition and contrast photoluminescent and translucent lithophane 500 starts when a user inputs a digitized photo (at 510). For example, the user may import, scan, or select a digitized photo a person, an animal, an object, etc.

In some embodiments, the monochrome to full simulated color process for producing 3D-appearing self-illuminating high definition and contrast photoluminescent and translucent lithophane 500 performs a first sub-process ("PROCESS 1") by a 3D modeler program (at 520). Specifically, in some embodiments, the 3D modeler program extrudes the digitized photo using dark luminance information and then a short base is added that has a light reflector and a glow layer behind the extruded photo.

In some embodiments, the monochrome to full simulated color process for producing 3D-appearing self-illuminating high definition and contrast photoluminescent and translucent lithophane 500 then performs a second sub-process ("PROCESS 2") by a 3D slicer program (at 530). During the second sub-process, the 3D slicer program sets up printing parameters of layer height, infill percentage, and amount of solid layers for the extruded photo and renders a 3D printer gcode file.

Next, the monochrome to full simulated color process for producing 3D-appearing self-illuminating high definition and contrast photoluminescent and translucent lithophane 500 of some embodiments performs a third sub-process ("PROCESS 3") by post-processing of the 3D slicer program (at 540). During the third sub-process, the post-processing by the 3D slicer program involves dividing the extruded photo height by as many layers as are needed to represent the colors to be used from top to bottom. In some embodiments, the post-processing by the 3D slicer program goes in order from light to dark. In some other embodiments, the post-processing by the 3D slicer program goes in order from dark to light. In some embodiments, the post-processing by the 3D slicer program processes monochrome version of the lithophane from two layers only, while simulated color lithophanes are possible with three or more layers. An example of a two-layer monochrome lithophane 210 is described above by reference to FIG. 2. Similarly, examples of simulated color lithophanes are described in the three-layer lithophane 220 and the four-layer lithophane 230 described above by reference to FIG. 2. It goes without saying that the more layers stacked together in a single lithophane, and the more variations of dark and light information represented in those layers, the better the color definition of the resulting 3D-appearing self-illuminating high definition and contrast photoluminescent and translucent lithophane.

Thus, the monochrome to full simulated color process for producing 3D-appearing self-illuminating high definition and contrast photoluminescent and translucent lithophane 500 of some embodiments triggers a 3D printer to output the resulting 3D-appearing self-illuminating high definition and contrast photoluminescent and translucent lithophane (at 550), whether a monochrome or full simulated color output, or any partial simulated color lithophane output in between. In some embodiments, after the 3D printer outputs the 3D-appearing self-illuminating high definition and contrast photoluminescent and translucent lithophane, then the monochrome to full simulated color process for producing 3D-appearing self-illuminating high definition and contrast photoluminescent and translucent lithophane 500 ends.

The monochrome to full simulated color process for producing 3D-appearing self-illuminating high definition and contrast photoluminescent and translucent lithophane 500 of the present disclosure generally works by having the dark colored translucent plastics where the luminance values are at the dark low values (the upper layers which are an embossing of those luminance values) and light colored translucent plastics backed by a layer of glow in the dark green at the highest light luminance values (as the bottom layers which are an embossing of those luminance values). While the monochrome to full simulated color process for producing 3D-appearing self-illuminating high definition and contrast photoluminescent and translucent lithophane is one of the processes for producing 3D-appearing self-illuminating high definition photoluminescent lithophane of the present disclosure, another one of the processes for producing 3D-appearing self-illuminating high definition photoluminescent lithophane, namely, a full color process for producing 3D-appearing self-illuminating high definition photoluminescent lithophane, is described in the next section.

The above-described embodiments of the monochrome to full simulated color process for producing 3D-appearing self-illuminating high definition and contrast photoluminescent and translucent lithophane are presented for purposes of illustration and not of limitation. While these embodiments of the monochrome to full simulated color process for producing 3D-appearing self-illuminating high definition and contrast photoluminescent and translucent lithophane have been described with reference to numerous specific details, one of ordinary skill in the art will recognize that the monochrome to full simulated color process for producing 3D-appearing self-illuminating high definition and contrast photoluminescent and translucent lithophane can be embodied in other specific forms without departing from the spirit of the monochrome to full simulated color process for producing 3D-appearing self-illuminating high definition and contrast photoluminescent and translucent lithophane is not to be limited by the foregoing illustrative details, but rather is to be defined by the appended claims.

II. Full Color Process for Producing 3D-Appearing Self-Illuminating High Definition Photoluminescent Lithophane In some embodiments, the full color process for producing 3D-appearing self-illuminating high definition photoluminescent lithophane creates three distinct color separation layers, a luminance mask, and luminance pump of a digitized full color picture. In some embodiments, the three distinct color separation layers include a red separation layer, a green separation layer, and a blue separation layer. In some embodiments, the full color process for producing 3D-appearing self-illuminating high definition photoluminescent lithophane uses all three color separations to extrude each according to the light information of that color to create color plates that show all the definition of the digitized picture in complete darkness and enhance it to give it a 3D look or appearance. In some embodiments, the full color luminance information is extruded to the dark as depth and is printed as a transparent layer, such as a transparent piece of plastic, which is used as a luminance mask. In some embodiments, the full color luminance information is extruded to the light as depth and is printed in quasi-color formula that is used for producing 3D-appearing self-illuminating high definition photoluminescent lithophane to pump light through the rest of the plates and bring the overall brightness up. In some embodiments, the full color process for producing 3D-appearing self-illuminating high definition photoluminescent lithophane combines the luminance mask and pump with the red, green, and blue separation layers to produce the 3D-appearing self-illuminating high definition full color photoluminescent lithophane of the digitized picture.

The full color process for producing 3D-appearing self-illuminating high definition photoluminescent lithophane of the present disclosure may be comprised of the following elements. This list of possible constituent elements is intended to be exemplary only and it is not intended that this list be used to limit the full color process for producing 3D-appearing self-illuminating high definition photoluminescent lithophane of the present application to just these elements. Persons having ordinary skill in the art relevant to the present disclosure may understand there to be equivalent elements that may be substituted within the present disclosure without changing the essential function or operation of the full color process for producing 3D-appearing self-illuminating high definition photoluminescent lithophane.

1. Start with a color (full color) image (e.g., scan a color photo or picture or use an existing full color digital image).

2. Create red, green, and blue copies of the image. For example, use a photo manipulation program, such as Gimp or Photoshop, to make a red separation, a green separation, and a blue separation of the image, and then save each (e.g., as a jpeg image file).

3. Create color extrusion channels as red, green, and blue color plates in a 3D modeling program (e.g., Blender, 3D Builder, etc.) by first making a small extrusion base and extruding each of the separations (red, green, and blue) with the light information of the image separation raised and used to extrude higher as it is lighter. Then save each color plate as a 3D model file (e.g., ".STL" formatted file).

4. Create a luminance mask by dark information extrusion of the luminance of the original color image and save it as a 3D model file (e.g., ".STL" file).

5. Create a luminance pump by light information extrusion of the luminance of the original color image and save it as a 3D model file (e.g., the ".STL" file). Once processed in the 3D Slicer program then put gcode file in slicer post processing program and setup to make with the quasi-color formula by setting the heights to change plastics to create the light pump strengths as deemed by the information.

6. Print out (3D print, using slicer program) each of the color plates, using only the glow in the dark color for that plate for each of the red, green, and blue plates. Note that glow in the dark full color can be done with all three plastics being glow in the dark (red, green, and blue) and a clear plastic or, if needed, with only a single color can be substituted for a translucent colored plastic with the other two colors being glow in the dark plastics. For the single color, red or blue is preferable, but not green as it is the strongest. It is even possible that one could create full color with replacing both blue and red with translucent colored plastics but then the green channel needs to be large to have the strength to get through two colored plates.

7. Print out (3D print) the luminance mask with a piece of clear plastic (i.e., since the luminance mask is a single piece, it can be setup to be printed with just clear plastic).

8. Print out (3D print) the luminance pump using quasi-color formula using all three glow in the dark plastics switching plastics as was defined when the slicer post processing program was used to setup the print file for quasi-color.

9. Stack the five pieces (red, green, and blue plates, luminance pump, and the luminance mask) after printing. While stacking order may vary, the following stacking order from bottom to top is preferred: luminance pump, green, blue, red, and then the luminance mask. Note that printing out and stacking these five pieces is needed in the full color process.

Figure 6:
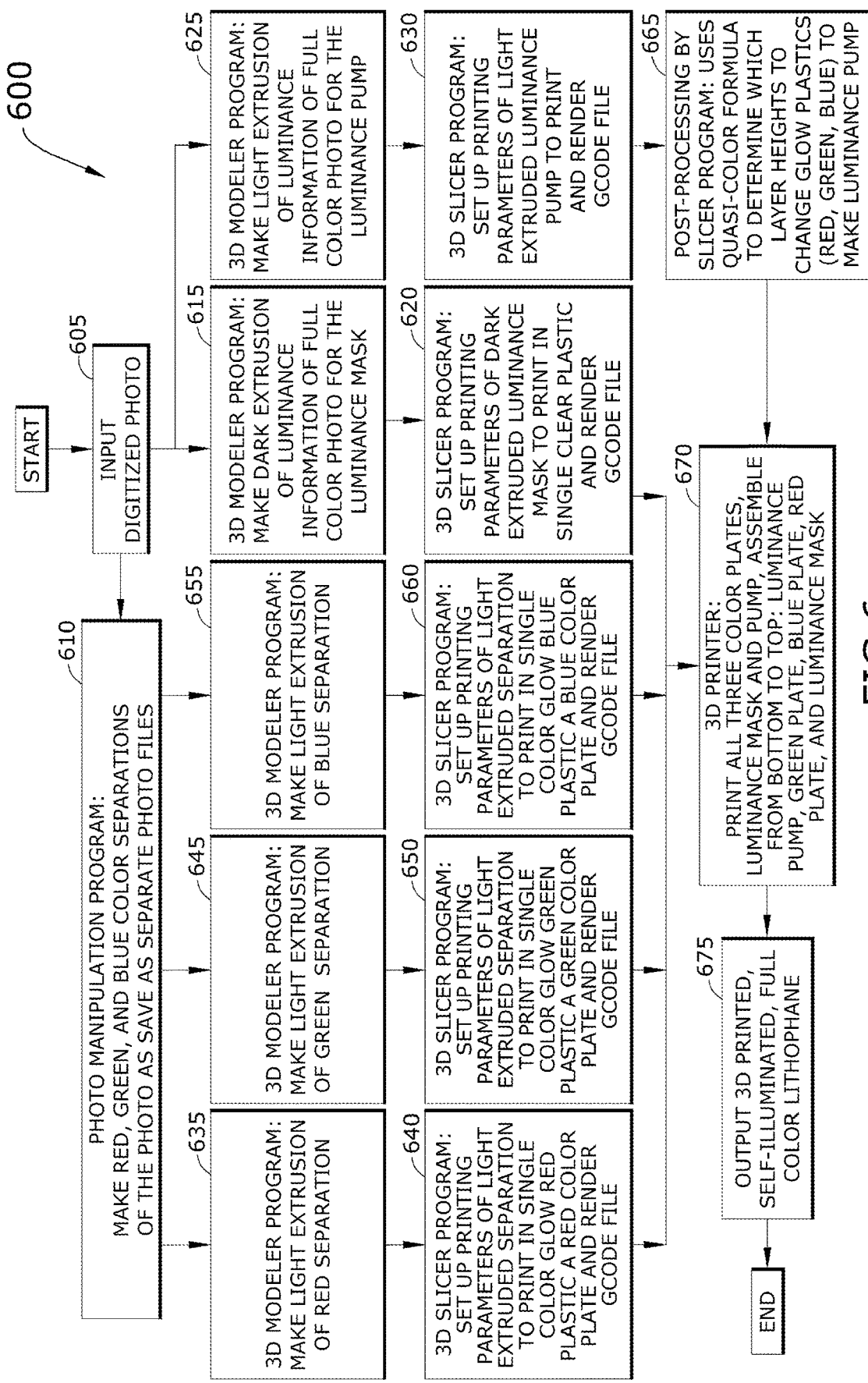
FIG. 6 conceptually illustrates a full color process for producing 3D-appearing self-illuminating high definition photo luminescent lithophane in some embodiments.

By way of example, FIG. 6 conceptually illustrates a full color process for producing 3D-appearing self-illuminating high definition photo luminescent lithophane 600. As shown in this figure, the full color process for producing 3D-appearing self-illuminating high definition photo luminescent lithophane 600 starts by inputting a digitized photo (at 605). The digitized photo can include a subject, such as a person, an animal, an object, or no specific subject, such as a general landscape.

After inputting the digitized photo, the full color process for producing 3D-appearing self-illuminating high definition photo luminescent lithophane 600 of some embodiments makes red, green, and blue color separations of the digitized photo (at 610) by a photo manipulation program to save as separate photo files. For example, a user of a photo manipulation program, such as Gimp or Photoshop, may create red, green, and blue copies of the digitized photo for the red separation, the green separation, and the blue separation, respectively. Next, the full color process for producing 3D-appearing self-illuminating high definition photo luminescent lithophane 600 makes a dark extrusion, by a 3D modeler program, of luminance information of the full color photo for a luminance mask (at 615). Then the full color process for producing 3D-appearing self-illuminating high definition photo luminescent lithophane 600 sets up printing parameters, by way of a 3D slicer program, of dark extruded luminance mask (at 620) to print in a single clear plastic and render a gcode file.

In some embodiments, the full color process for producing 3D-appearing self-illuminating high definition photo luminescent lithophane 600 makes a light extrusion, by way of the 3D modeler program, of luminance information of the full color photo for a luminance pump (at 625). Next, the full color process for producing 3D-appearing self-illuminating high definition photo luminescent lithophane 600 sets up printing parameters of light extruded luminance pump (at 630), by way of the 3D slicer program, to print and to render gcode file.

In some embodiments, after making the red, green, and blue color separations of the digitized photo (at 610), the full color process for producing 3D-appearing self-illuminating high definition photo luminescent lithophane 600 makes a light extrusion of the red separation by way of the 3D modeler program (at 635) and sets up printing parameters of the light extruded separation, by the 3D slicer program, to print a red color plate in single color glow red plastic and to render the gcode file (at 640).

In some embodiments, the full color process for producing 3D-appearing self-illuminating high definition photo luminescent lithophane 600 also makes a light extrusion of the green separation by way of the 3D modeler program (at 645) and sets up printing parameters of the light extruded separation, by the 3D slicer program, to print a green color plate in single color glow green plastic and to render the gcode file (at 650).

In some embodiments, the full color process for producing 3D-appearing self-illuminating high definition photo luminescent lithophane 600 further makes a light extrusion of the blue separation by way of the 3D modeler program (at 655) and sets up printing parameters of the light extruded separation, by the 3D slicer program, to print a blue color plate in single color glow blue plastic and to render the gcode file (at 660).

In some embodiments, after making the light extrusion of luminance information of the full color photo for the luminance pump (at 625) and setting up printing parameters of the light extruded luminance pump (at 630), the full color process for producing 3D-appearing self-illuminating high definition photo luminescent lithophane 600 performs post-processing, by way of the 3D slicer program, and uses the quasi-color formula to determine which layer heights to change glow plastics (red, green, blue) to make the luminance pump (at 665).

In some embodiments, the full color process for producing 3D-appearing self-illuminating high definition photo luminescent lithophane 600 continues to the next step which involves the 3D printer printing (at 670) all three of the color plates (the red plate, the green plate, and the blue plate), the luminance mask, and the luminance pump, and then assemble them all from bottom to top, with the luminance pump (the lightest) on the bottom of the stack, followed by the green plate, the blue plate, the red plate, and the luminance mask (the darkest) on the top of the stack.

Next, the full color process for producing 3D-appearing self-illuminating high definition photo luminescent lithophane 600 of some embodiments outputs the 3D printed, self-illuminating full color high definition photo luminescent lithophane. Then the full color process for producing 3D-appearing self-illuminating high definition photo luminescent lithophane 600 of some embodiments ends.

Figure 7:
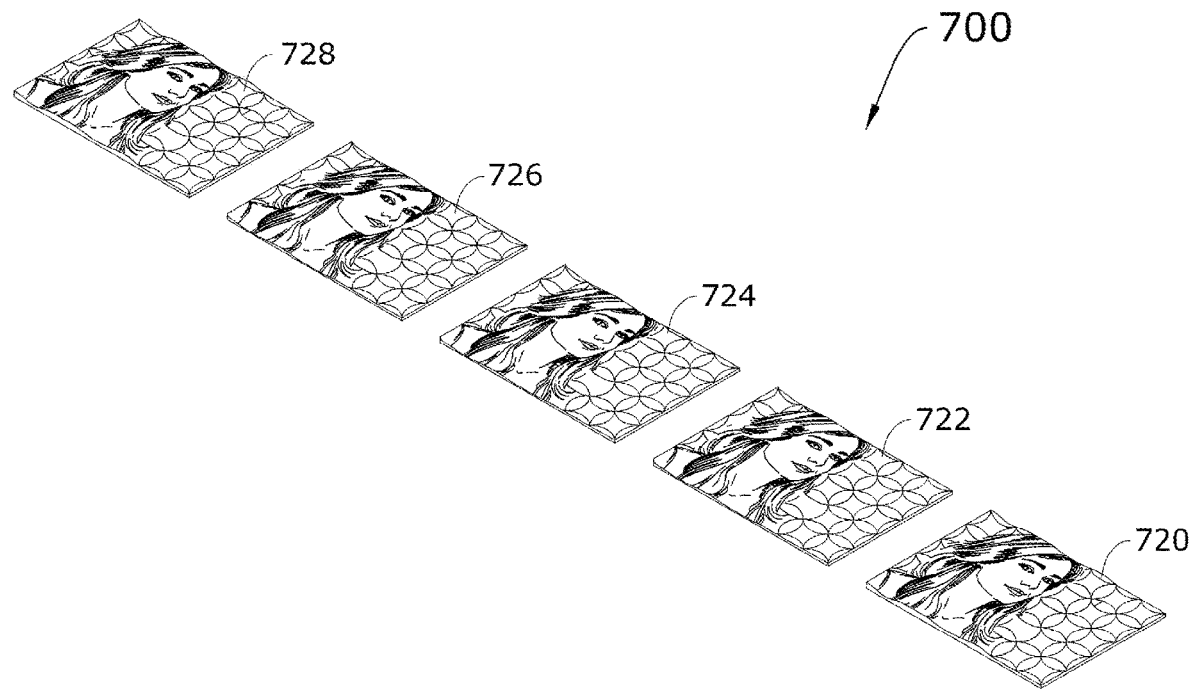
FIG. 7 conceptually illustrates a perspective view of five layers (pieces) that make up a full color lithophane produced by the full color process of FIG. 6.

By way of example, FIG. 7 conceptually illustrates a perspective view of five unstacked layers 700 (pieces) which when appropriately stacked make up a full color lithophane produced by the full color process of FIG. 6. As shown in this figure, the five unstacked layers 700 are pieces that stack together, one on top of another. In this case, the five unstacked layers 700 include a bottom layer 720, a first middle layer 722, a second middle layer 724, a third middle layer 726, and a top layer 728. An order starts to take shape when stacking occurs. Stacking is demonstrated in the next two figures.

Figure 8:
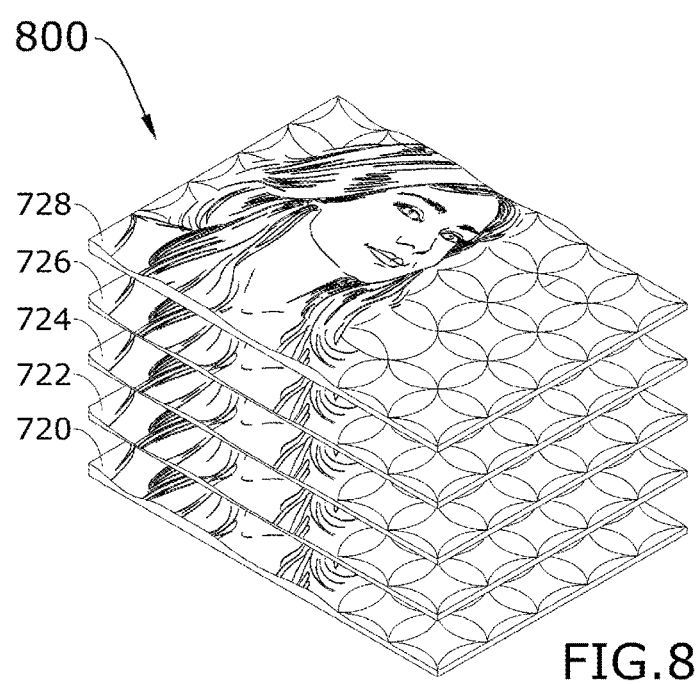
FIG. 8 conceptually illustrates a perspective view of the five layers (pieces) separated in a stacking order to make the full color lithophane.

By way of example, FIG. 8 conceptually illustrates a perspective view of the five layers (pieces) separated in a stacking order 800 to make the full color lithophane. Specifically, the stacking order 800 shown in this figure starts at the top with the top layer 728 and proceeds down to the bottom in the following order: the third middle layer 726 underneath the top layer 728, the second middle layer 724 underneath the third middle layer 726, the first middle layer 722 underneath the second middle layer 724, and, at the base of the stacking order 800, the bottom layer 720. In addition to demonstrating an order of the five layers (pieces), the stacking order 800 includes a relative dark to light order (from top to bottom), such that the top layer 728 is the luminance mask, the third middle layer 726 is the red plate, the second middle layer 724 is the blue plate, the first middle layer 722 is the green plate, and, pumping light from the bottom through the five layers up to the top, the bottom layer 720 is the luminance pump.

Figure 9:
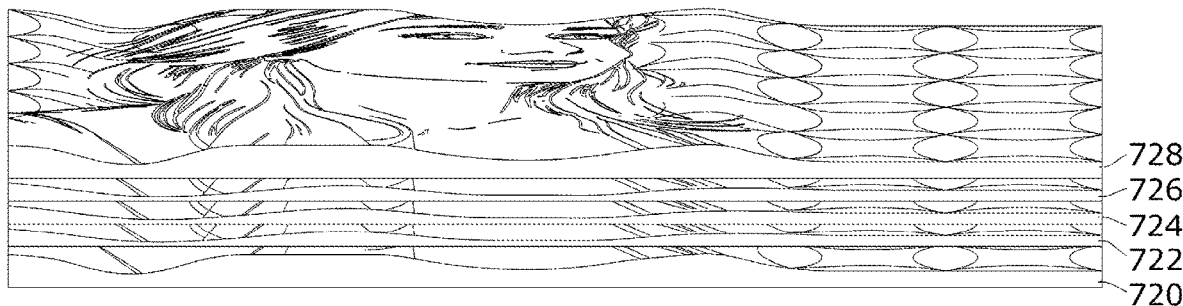
FIG. 9 conceptually illustrates a perspective view of the five layers (pieces) closely stacked for charging and viewing the full color lithophane.
Figure 10:
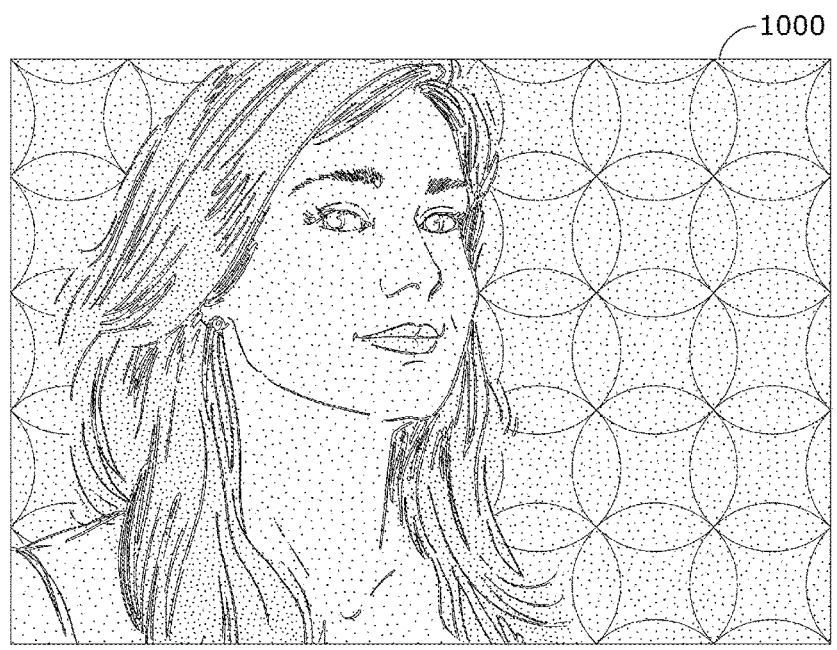
FIG. 10 conceptually illustrates the full color lithophane produced by the full color process of FIG. 6.

Further demonstrating stacking of the layers, FIG. 9 conceptually illustrates a perspective view of the five layers (pieces) closely stacked according to the stacking order 800 for charging and viewing the full color lithophane. Specifically, the order of the layers remains the same while the layers are moved closer together in the stack, specifically, from bottom to top (lightest to darkest) the bottom layer 720 luminance pump, followed by the green plate first middle layer 722, then the blue plate second middle layer 724, above which is the red plate third middle layer 726, and, on top, the luminance mask top layer 728.

Resulting from the stacking of the five layers (pieces) according to the stacking order 800 from bottom to top and lightest (luminance pump) to darkest (luminance mask), is the full color lithophane. By way of example, FIG. 10 conceptually illustrates the full color lithophane 1000 produced by the full color process of FIG. 6.

In some embodiments, the luminance pump is employed in the full color process for producing 3D-appearing self-illuminating high definition photoluminescent lithophane to pump light through the rest of the plates and bring the overall brightness up. In some embodiments, the luminance pump is a plate made of a balance of red, green, and blue glow plastics to make up white. In some embodiments, luminance information is then extruded from the original full color image with the dark information being raised. Next, in some embodiments, the pump extruded model is sliced in the 3D slicer program to give the balanced white (from the mixture of red, green, and blue glow plastics) and then printed. In some embodiments, after printing, the balanced white piece is then placed at the bottom of the stack (below the green plate in the preferred ordering noted above), which allows for pumping light through the rest of the plates to increase overall brightness.

To make the monochrome to full simulated color 3D-appearing self-illuminating high definition and contrast photoluminescent and translucent lithophane and full color 3D-appearing self-illuminating high definition photoluminescent lithophane of a digitized photo described in this disclosure, one would perform either the monochrome to simulated full color process for producing 3D-appearing self-illuminating high definition photoluminescent lithophane or the full color process for producing 3D-appearing self-illuminating high definition photoluminescent lithophane in a 3D modeling program on a computing device to process a digitized photo. The person would also use programs of a 3D printing slicer to properly assign the plastic colors to the appropriate parts of the processed photo or a post slicer processing program can be used to assign heights within the lithophane to change colors appropriate to the lithophane build when it is printed.

Then, the person would use a 3D printer for the monochrome to full simulated color process or the full color process, with an opaque (in light) strong glow in the dark green plastic for the highest light luminance values, light colored translucent plastics for the rest of the light luminance values and dark colored translucent plastics for the dark luminance values for the 3D printer to use in creating the object. Thus, a 3D modeling program, 3D slicer programs, and a 3D printer with multiple opaque (in light) glow in the dark plastic colors and translucent colored plastics are the most commonly used components for performing the processes for producing 3D-appearing self-illuminating high definition photoluminescent lithophane of the present disclosure.

To use the monochrome to full simulated color 3D-appearing self-illuminating high definition and contrast photoluminescent and translucent lithophane and full color 3D-appearing self-illuminating high definition photoluminescent lithophane of a digitized photo of the present disclosure, a person can produce photo-based monochrome or full color glow in the dark plastics (lithophane) that show an image of the photo in high definition (highly detailed), which can be used for informational purposes, safety purposes, or as a collectible item, or any other use a person can imagine.

Also, the monochrome to full simulated color 3D-appearing self-illuminating high definition and contrast photoluminescent and translucent lithophane and full color 3D-appearing self-illuminating high definition photoluminescent lithophane of a digitized photo can be adapted for use in adding a placard to any object, with the placard showing information (pictorial or written information) that is visible for a short period of time in very low light situations or in darkness without any light. In some embodiments, the monochrome to full simulated color 3D-appearing self-illuminating high definition and contrast photoluminescent and translucent lithophane and full color 3D-appearing self-illuminating high definition photoluminescent lithophane of a digitized photo are able to carry out other functions, including, without limitation, (i) producing highly detailed emergency signs that can be back lit but when power fails but which will light up for a limited amount of time, (ii) producing powerless light meters, such as a gray scale version with noted levels of light by strength of light (luminance), and (iii) producing a low power laser beam dump that absorbs the light from the laser without changing most of it into heat, and which is lighter and less expensive than the typical graphite brick that is used for such purposes.

The above-described embodiments of the monochrome to full simulated color 3D-appearing self-illuminating high definition and contrast photoluminescent and translucent lithophane and the full color 3D-appearing self-illuminating high definition photoluminescent lithophane of a digitized photo are presented for purposes of illustration and not of limitation. While these embodiments of the monochrome to full simulated color 3D-appearing self-illuminating high definition and contrast photoluminescent and translucent lithophane and the full color 3D-appearing self-illuminating high definition photoluminescent lithophane of a digitized photo have been described with reference to numerous specific details, one of ordinary skill in the art will recognize that the monochrome to full simulated color 3D-appearing self-illuminating high definition and contrast photoluminescent and translucent lithophane and the full color 3D-appearing self-illuminating high definition photoluminescent lithophane of a digitized photo can be embodied in other specific forms without departing from the spirit of either the monochrome to full simulated color 3D-appearing self-illuminating high definition and contrast photoluminescent and translucent lithophane or the full color 3D-appearing self-illuminating high definition photoluminescent lithophane of a digitized photo. Thus, one of ordinary skill in the art would understand that the monochrome to full simulated color 3D-appearing self-illuminating high definition and contrast photoluminescent and translucent lithophane and the full color 3D-appearing self-illuminating high definition photoluminescent lithophane of a digitized photo are not to be limited by the foregoing illustrative details, but rather are to be defined by the appended claims.

III. Quasi-Color Process for Producing Quasi-Color Photoluminescent and Translucent Lithophane Using Only Luminance Information of a Digitized Photo In some embodiments, the quasi-color process for producing quasi-color photoluminescent and translucent lithophane of a digitized picture using only luminance information from the digitized picture performs a plurality of steps comprising (i) inputting a digitized photo, using a 3D modeling program to dark extrude the photo according to luminance information, (ii) saving the dark extrusion as a 3D model, (iii) configuring printing parameters of the dark extrusion 3D model via a 3D printing slicer program and outputting a gcode file in response to the configured printing parameters for a printing by a 3D printer, (iv) updating the gcode file during a material post processing stage that sets lithophane color heights to create the quasi-color effect, and (v) using the updated gcode file by the 3D printer to produce the quasi-color photoluminescent and translucent lithophane.

The quasi-color process for producing quasi-color photoluminescent and translucent lithophane of a digitized picture using only luminance information from the digitized picture of the present disclosure may be comprised of the following detailed steps and elements. This list of possible constituent detailed steps and elements is intended to be exemplary only and it is not intended that this list be used to limit the quasi-color process for producing quasi-color photoluminescent and translucent lithophane of a digitized picture using only luminance information from the digitized picture of the present application to just these steps or elements. Persons having ordinary skill in the art relevant to the present disclosure may understand there to be equivalent steps and elements that may be substituted within the present disclosure without changing the essential function or operation of the quasi-color process for producing quasi-color photoluminescent and translucent lithophane of a digitized picture using only luminance information from the digitized picture.

1. In a 3D builder software application/program (such as the Microsoft program "3D Builder") extrude the photo according to luminance with the dark information (from total black) as the extruded information that gets height according to strength (darker the info the higher the extrusion from the base) to create the base object for the picture to be made. Once that is made it is saved as an STL object for the slicer program to use. Dimensions used to dark extrude the photo in this formula are that the base is 29% of the total height of the lithophane.

2. Bring the single piece dark extrusion 3D model of the photo (STL format) into the 3D printing Slicer program "Simplify 3D" (In this example). Set all the parameters for printing out the lithophane as a single color (this will be changed in the material post processing program to be used after the slicer program. Typical parameters used for printing include 0.1 mm layer height (first layer 0.2 mm), 4 bottom layer shells, 3 outline shells, and 90% infill. These main parameters define how the quasi-color photoluminescent lithophane will be produced.

3. Input the gcode file into the material post processing program to set at what heights the plastic is to change to a new one. After bringing in the gcode file, the settings for the printer color changes are made with the heights set as to where the plastic changes are. They are as follows for the lithophane of 1.8 mm base and 6.2 mm total height, with dark extruded information including 4.4 mm of information, with the color stack from start to finish being:

White (non-glow reflector base)—5/100 of the total height
Glow Green—13/100 of the total height
Translucent Green—6/100 of the total height
Blue—10/100 of total height
Red—19/100 of total height
Blue—10/100 of total height
Red—16/100 of total height
Blue—21/100 of total height In some embodiments, the plastics are polylactic-acid (PLA) plastics.

In some embodiments, the printer will stop at each point to allow a plastic change for a new color at each height until the object is complete. In some embodiments, once it is finished printing the quasi-color photoluminescent and translucent lithophane is complete.

Further detailed information for the color stack is based on production of one or more quasi-color photoluminescent and translucent lithophane output printings, where the white (no glow reflector base) is at the bottom of the stack, followed by a green layer (comprised of first glow in the dark green, then non glow translucent green), a first blue layer, a first red layer, a second blue layer, a second red layer, and a third (top) blue layer. In some embodiments, the green layer is split between a glow green and a non glow translucent PLA plastics and the red layers, and the blue layers all non-glow translucent PLA plastics. In some embodiments all plastics used are glow except for the base which will still be non translucent white PLA plastic (even the green layer which is normally both can be combined into one large glow green layer). In some embodiments all plastics are non glow translucent PLA plastic including the base in which a clear plastic is used instead.

In some embodiments, the various layers and the heights of the various layers correspond to luminance ranges in a histogram ten bit (10 bit) luminance scale that specifies the value zero (0) as being total black darkness and the value 1023 as being all white lightness. In some embodiments, the contribution of each layer to the overall quasi-color photoluminescent lithophane that is produced is quantified as a percentage contribution. The ordered layers (from top to bottom), the colors of the ordered layers, the heights of the ordered layers, the percentage contribution of the ordered layers, and the histogram 10 bit luminance scale value ranges of the ordered layers follows here:

Blue (top) layer (the third blue layer), 21% of the total height of the quasi-color photoluminescent lithophane that is produced, 1.3 mm individual layer height, 29.5% contribution info, 0 to 373 on Histogram 10 bit luminance scale (where 0=total darkness and 1023=all white light).

Red layer (the second red layer), 16% of the total height of the quasi-color photoluminescent lithophane that is produced, 1.0 mm individual layer height, 22.7% contribution info, 373 to 605 on Histogram 10 bit luminance scale.

Blue layer (the second blue layer), 10% of the total height, 6.8% contribution info, 605 to 675 on Histogram 10 bit luminance scale.

Red layer (the first red layer), 19% of the total height, 27.2% contribution info, 675 to 953 on Histogram 10 bit luminance scale.

Blue layer (the first blue layer), 10% of the total height, 6.8% contribution info, 953 to 1023 on Histogram 10 bit luminance scale.

Green layer, 19% of the total height. 13% glow in the dark green, 6% non glow translucent plastic green White layer (non glow reflector base) 5% of the total height.

While the values of the example quasi-color photoluminescent lithophane described above have produced decently accurate color-like representations of photos (which may be black & white or color) based on luminance information in the photos, a person of ordinary skill in the relevant art would appreciate that many other configurations and breakdown of scales and numbers are possible.

Figure 11:
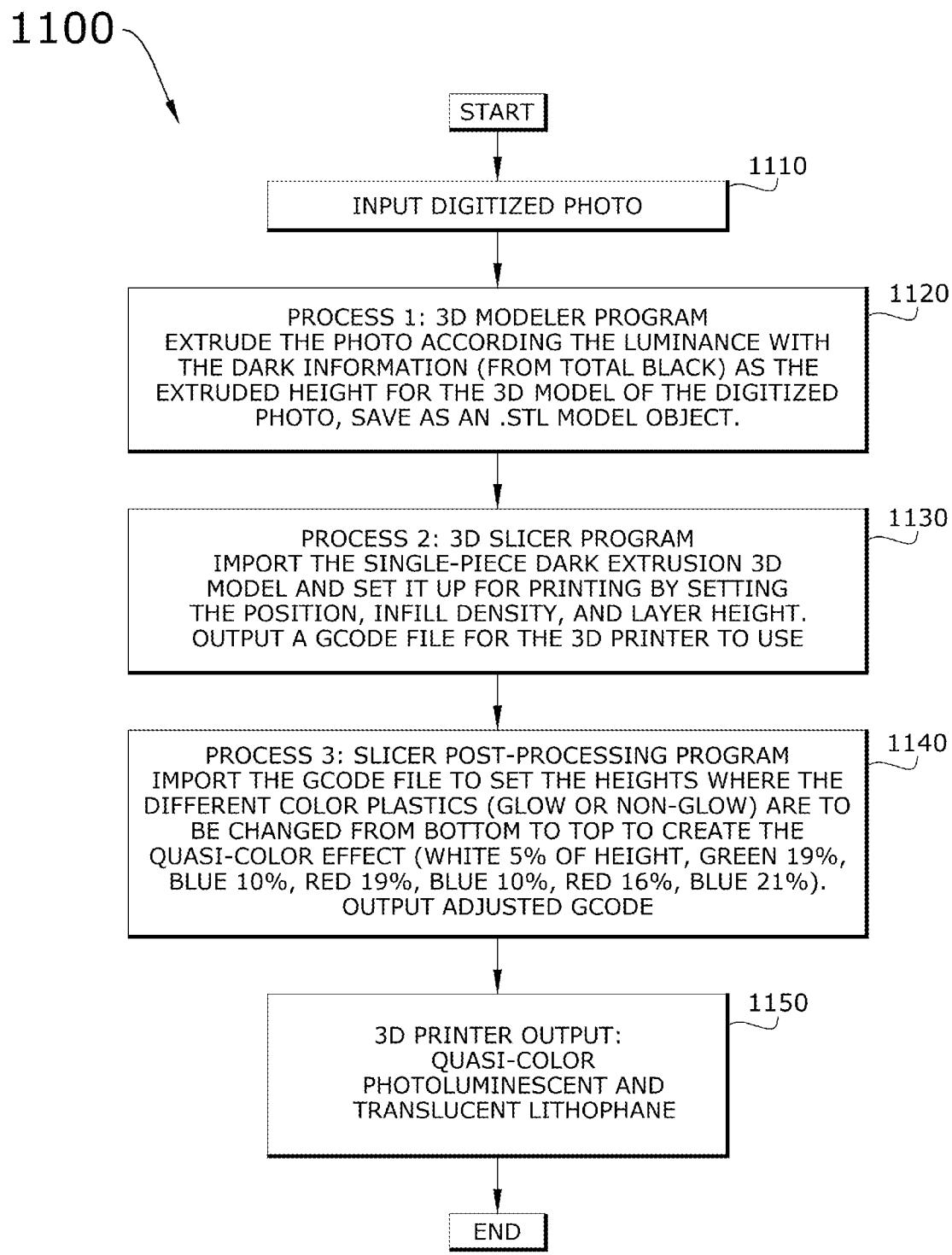
FIG. 11 conceptually illustrates a process for creating a quasi-color photoluminescent and translucent lithophane from a digitized photo in some embodiments.

By way of example, FIG. 11 conceptually illustrates a quasi-color process for creating a quasi-color photoluminescent and translucent lithophane from a digitized photo 1100. As shown in this figure, the quasi-color process for creating a quasi-color photoluminescent and translucent lithophane from a digitized photo 1100 starts when a user inputs a digitized photo (at 1110). The photo can include any kind of subject (e.g., person, animal, object or thing) or non-subject scene (e.g., landscape, etc.). The photo can be input by digitally importing (such as from an electronic system including, for example, a digital camera or a mobile computing/communications device), scanning, or selecting the digitized photo from a hard drive, disk, cloud resource, application service, etc.

In some embodiments, the quasi-color process for creating a quasi-color photoluminescent and translucent lithophane from a digitized photo 1100 performs a 3D modeler program process ("PROCESS 1") during which the 3D modeler program (at 1120) extrudes the digitized photo according to the luminance with the dark information (from total black) as the extruded height for the 3D model of the digitized photo, and saves it as an STL type model object.

In some embodiments, the quasi-color process for creating a quasi-color photoluminescent and translucent lithophane from a digitized photo 1100 then performs a 3D slicer program process ("PROCESS 2") during which the 3D slicer program (at 1130). imports the single-piece dark extrusion 3D model and sets it up for printing by setting the position, infill density, and layer height, and then outputting a gcode file for the 3D printer to use.

Next, the quasi-color process for creating a quasi-color photoluminescent and translucent lithophane from a digitized photo 1100 of some embodiments performs a post-processing sub-process ("PROCESS 3") during which post-processing by way of the 3D slicer program (at 1140) imports the gcode file to set the heights where the different color plastics (glow or non-glow) are to be changed from bottom to top to create the quasi-color effect (with white at 5% of height, green at 19%, blue at 10%, red at 19%, another blue at 10%, another red at 16%, and yet another blue at 21%), and then to output the adjusted gcode.

In some embodiments, the quasi-color process for creating a quasi-color photoluminescent and translucent lithophane from a digitized photo 1100 triggers a 3D printer to output the resulting quasi-color photoluminescent and translucent lithophane (at 1150). In some embodiments, after the 3D printer outputs the resulting quasi-color photoluminescent and translucent lithophane, then the quasi-color process for creating a quasi-color photoluminescent and translucent lithophane from a digitized photo 1100 ends.

Figure 12:
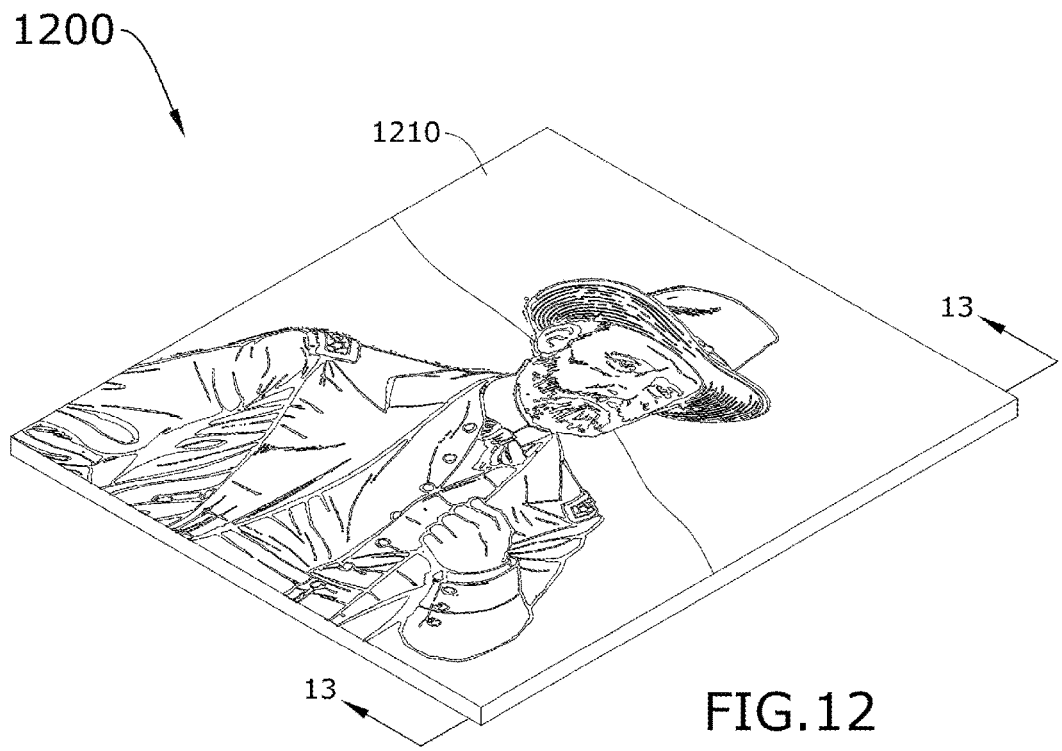
FIG. 12 conceptually illustrates a perspective view of the quasi-color photoluminescent and translucent lithophane, created by the process of FIG. 11.

By way of example, FIG. 12 conceptually illustrates a perspective view of the quasi-color photoluminescent and translucent lithophane 1200, depicting a subject 1210 as created by the quasi-color process for creating a quasi-color photoluminescent and translucent lithophane from a digitized photo 1100 of FIG. 11.

Figure 13:
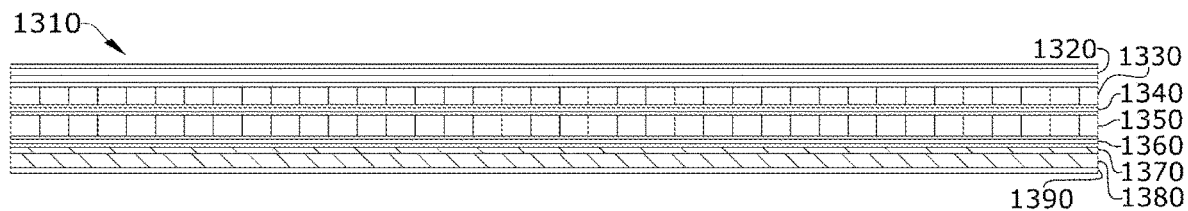
FIG. 13 conceptually illustrates a section view showing a single stack of eight layers (pieces) taken along line 13-13 of the quasi-color photoluminescent and translucent lithophane in some embodiments.

Now turning to a related example, FIG. 13 conceptually illustrates a section view showing a single eight layer stack 1310 of eight layers (pieces) taken along line 13-13 of the quasi-color photoluminescent and translucent lithophane. As shown in this figure, the eight layers of the single eight layer stack 1310 include a top blue layer 1320, an upper red layer 1330, a middle blue layer 1340, a lower red layer 1350, a lower blue layer 1360, a green layer 1370, another layer 1380, and a non glow reflector base layer 1390.

Figure 14:
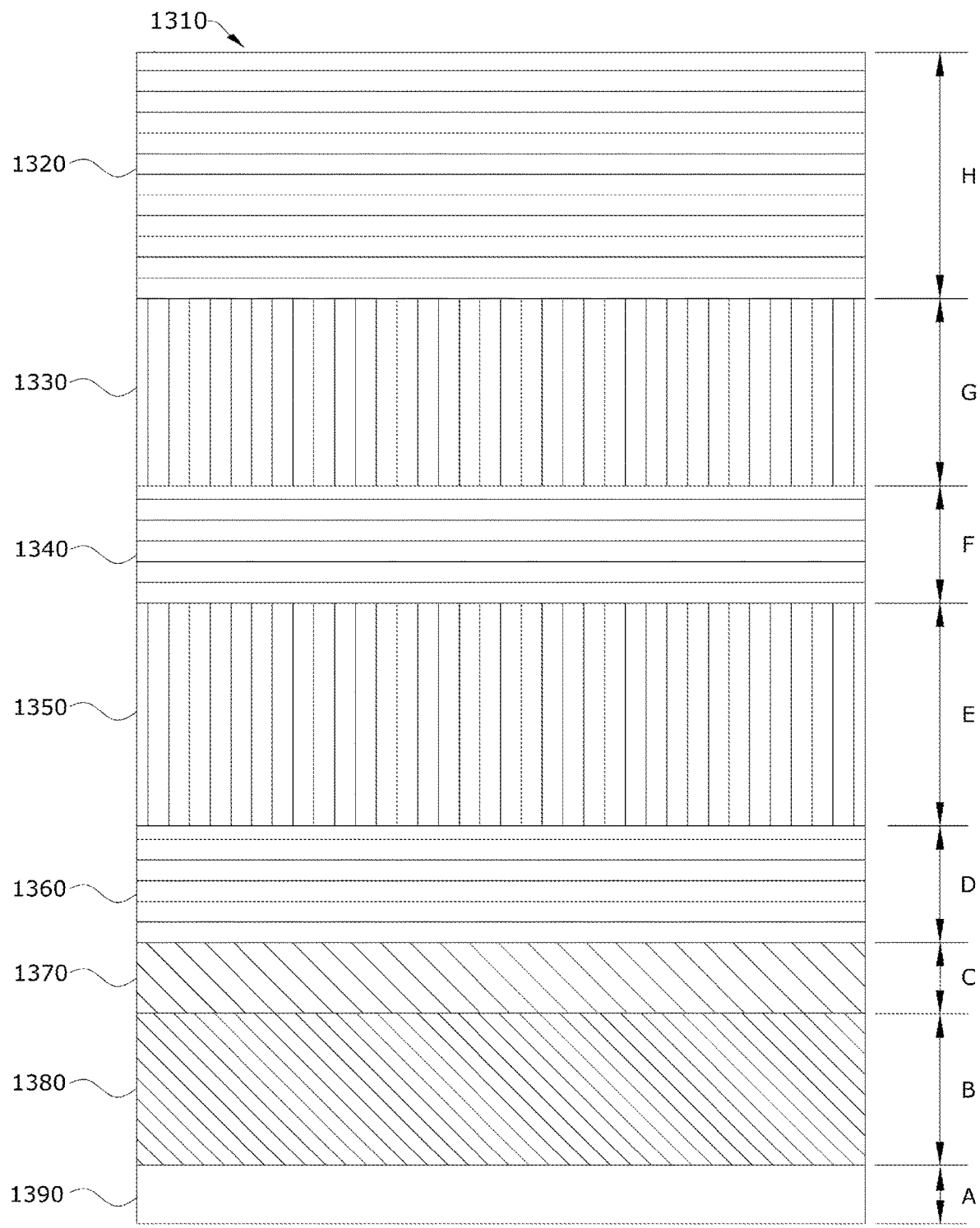
FIG. 14 conceptually illustrates a detailed side sectional view of the single stack of layers (pieces) that make up the quasi-color lithophane of FIG. 12.

By way of example, FIG. 14 conceptually illustrates a detailed side sectional view of the single eight layer stack 1310 of eight layers (pieces) 1310 that make up the quasi-color photoluminescent and translucent lithophane of FIG. 12. As shown in this figure, the eight layers of the single eight layer stack 1310 include the top blue layer 1320, the upper red layer 1330, the middle blue layer 1340, the lower red layer 1350, the lower blue layer 1360, the green layer 1370, the other layer 1380, and the non glow reflector base layer 1390.

In some embodiments, the top blue layer 1320 is the third of three blue layers (shown by lateral/horizontal line pattern) and accounts for 21% of the total height of the quasi-color photoluminescent and translucent lithophane 1200 that is produced, 1.3 mm individual layer height (denoted by "H" height arrow), 29.5% contribution information, and 0 to 373 on Histogram 10 bit luminance scale (where 0=total darkness and 1023=all white light).

In some embodiments, the upper red layer 1330 is the second of two red layers and accounts for 16% of the total height of the quasi-color photoluminescent and translucent lithophane 1200 that is produced, 1.0 mm individual layer height (denoted by "G" height arrow), 22.7% contribution information, and 373 to 605 on Histogram 10 bit luminance scale.

In some embodiments, the middle blue layer (the second of three blue layers) accounts for 10% of the total height (denoted by "F" height arrow) of the quasi-color photoluminescent and translucent lithophane 1200 that is produced, 6.8% contribution information, and 605 to 675 on Histogram 10 bit luminance scale.

In some embodiments, the lower red layer (the first of two red layers) accounts for 19% of the total height (denoted by "E" height arrow) of the quasi-color photoluminescent and translucent lithophane 1200 that is produced, 27.2% contribution information, and 675 to 953 on Histogram 10 bit luminance scale.

In some embodiments, the lower blue layer (the first blue layer of the three blue layers) accounts for 10% of the total height (denoted by "D" height arrow) of the quasi-color photoluminescent and translucent lithophane 1200 that is produced, 6.8% contribution information, and 953 to 1023 on Histogram 10 bit luminance scale.

In some embodiments, the other layer is a non glow translucent plastic green layer that accounts for 6% of the total height (denoted by "C" height arrow) of the quasi-color photoluminescent and translucent lithophane 1200 that is produced.

In some embodiments, the green layer is a glow in the dark green layer that accounts for 13% of the total height (denoted by "B" height arrow) of the quasi-color photoluminescent and translucent lithophane 1200 that is produced.

In some embodiments, the white layer is a non glow reflector base that accounts for 5% of the total height (denoted by "A" height arrow) of the quasi-color photoluminescent and translucent lithophane 1200 that is produced.

Figure 15:
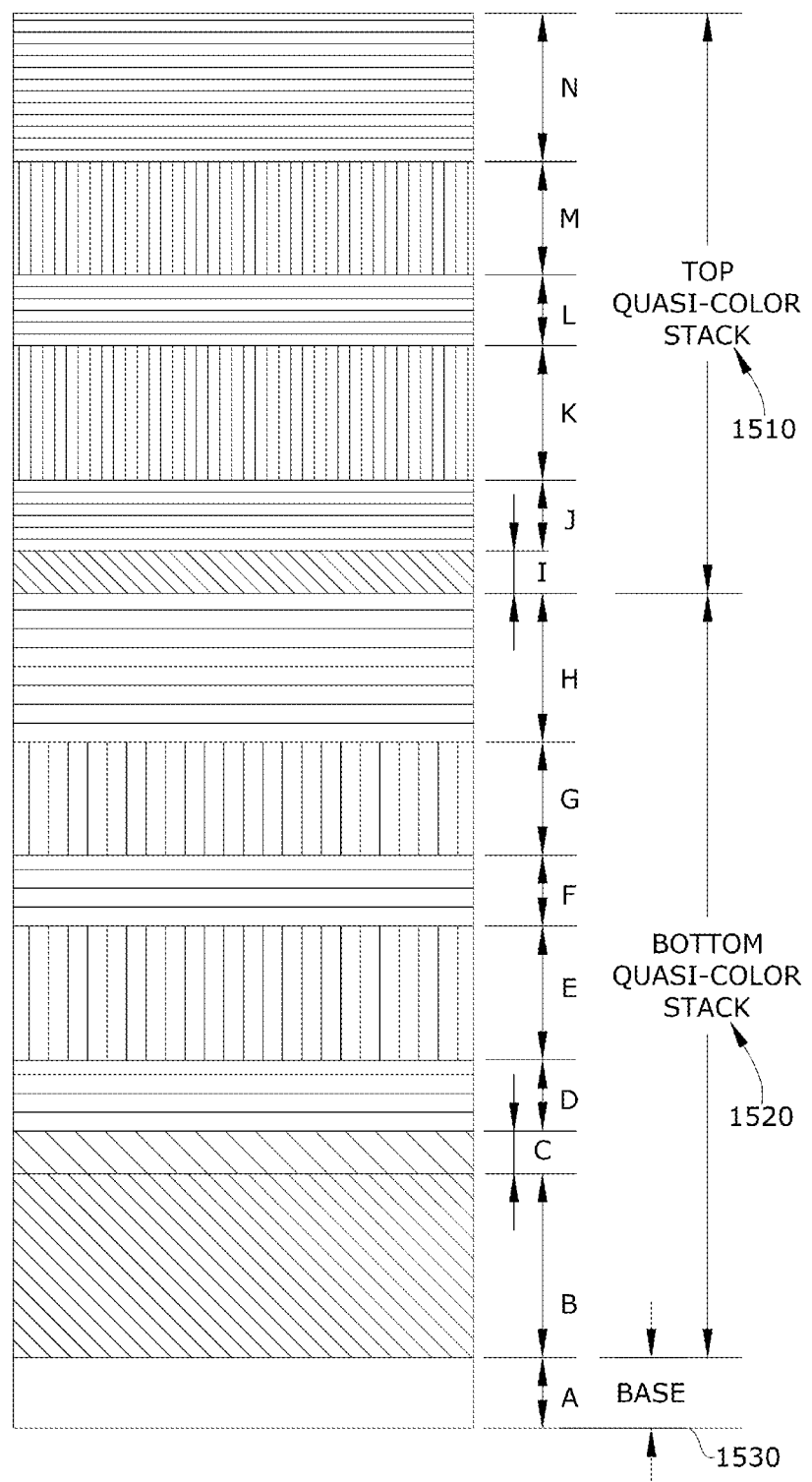
FIG. 15 conceptually illustrates a detailed side sectional view of top and bottom stacks of layers (pieces) based on the quasi-color formula of a quasi-color lithophane in some embodiments.

In a similar example, FIG. 15 conceptually illustrates a detailed side sectional view of top and bottom stacks of layers (pieces) based on the quasi-color formula of a quasi-color lithophane. A seven layer top quasi-color stack 1510 of seven layers (pieces) and a seven layer bottom quasi-color stack 1520 of seven layers (pieces), the seven layer top quasi-color stack 1510 and the seven layer bottom quasi-color stack 1520 making up the quasi-color photoluminescent and translucent lithophane when positioned on a base layer 1530.

Figure 16:
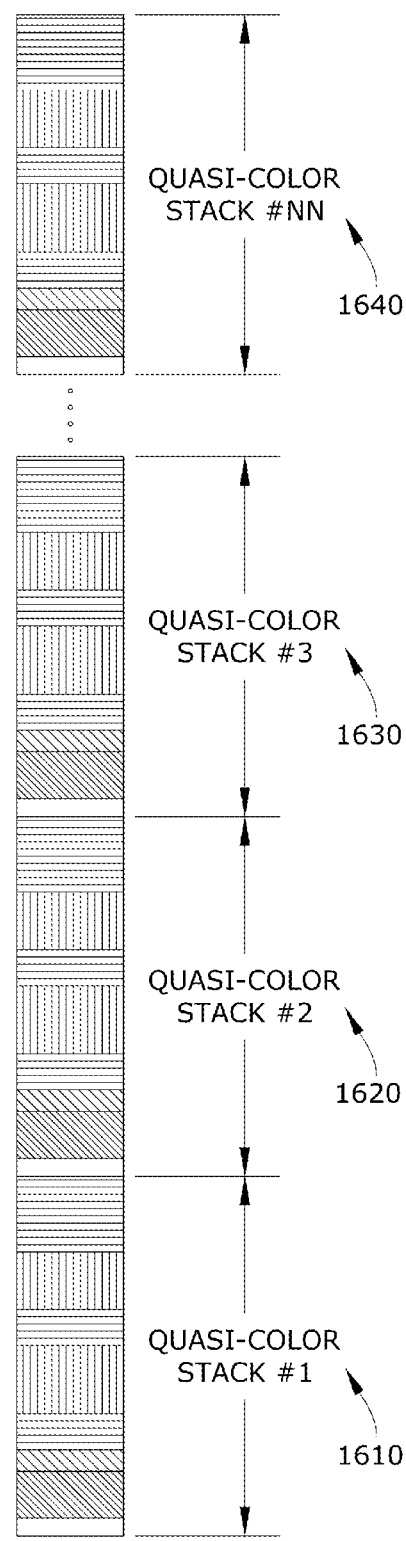
FIG. 16 conceptually illustrates a detailed side sectional view of several stacks of layers (pieces) based on the quasi-color formula of a quasi-color lithophane in some embodiments.

By way of another quasi-color example, FIG. 16 conceptually illustrates a detailed side sectional view of several stacks of layers based on the quasi-color formula of a quasi-color photoluminescent and translucent lithophane, such as the quasi-color photoluminescent and translucent lithophane described above by reference to FIG. 14. Specifically, the several stacks of layers shown in this figure include a first quasi-color stack of layers 1610, a second quasi-color stack of layers 1620, a third quasi-color stack of layers 1630, and a fourth quasi-color stack of layers 1640. Notably, the fourth quasi-color stack of layers 1640 may actually be a fifth, sixth, seventh, . . . , NNth quasi-color stack of layers.

The above-described embodiments of the quasi-color process for producing quasi-color photoluminescent and translucent lithophane of a digitized picture using only luminance information from the digitized picture are presented for purposes of illustration and not of limitation. While these embodiments of the quasi-color process for producing quasi-color photoluminescent and translucent lithophane of a digitized picture using only luminance information from the digitized picture have been described with reference to numerous specific details, one of ordinary skill in the art will recognize that the quasi-color process for producing quasi-color photoluminescent and translucent lithophane of a digitized picture using only luminance information from the digitized picture can be embodied in other specific forms without departing from the spirit of the quasi-color process. Thus, one of ordinary skill in the art would understand that the quasi-color process for producing quasi-color photoluminescent and translucent lithophane of a digitized picture using only luminance information from the digitized picture is not to be limited by the foregoing illustrative details, but rather is to be defined by the appended claims.

IV. Luminance Pump and Identifying Manipulations in a Photo by Way of the Quasi-Color Process for Producing Quasi-Color Photoluminescent and Translucent Lithophane of a Digitized Photo In some embodiments, the quasi-color process for producing quasi-color photoluminescent and translucent lithophane of a digitized picture using only luminance information from the digitized picture reveals manipulations made to a physical photo on which the digitized picture is based. In some embodiments, the manipulations revealed include post-exposure use of charcoal pencil to manipulate an appearance of the physical photo.

In some embodiments, a luminance pump is employed in the quasi-color process for producing quasi-color photoluminescent and translucent lithophane to pump light through the layers and bring the overall brightness up. In an opposite manner (negative), the luminance pump shows colors assigned to different luminance levels of a photo. As such, a photo can be made just from the luminance information with a dark extrusion of the information for the lithophane. As only the luminance (gray scale, or black and white) information is needed, the production of closely accurate quasi-color photoluminescent lithophane is possible. In some embodiments, the flatter the contrast between relative luminance levels, the less vivid the resulting colors of the quasi-color photoluminescent lithophane.

In some embodiments, when the luminance pump is employed in the quasi-color process for producing quasi-color process for producing quasi-color photoluminescent and translucent lithophane, the luminance information that is extruded from the original photo is used to identify the layers in which the information is to be present. Photo manipulations that have been done with charcoal or other darkening agents are then able to be easily identified by the quasi-color process, based on their relatively high values on the Histogram 10 bit luminance scale. In some instances, such manipulations are shown in the resulting quasi-color photoluminescent lithophane as more blue than surrounding areas, due to their relative darker luminance.

The above-described luminance pump and aspects of identifying manipulations in photos are presented for purposes of illustration and not of limitation. While these embodiments of the luminance pump and aspects of identifying manipulations in photos have been described with reference to numerous specific details, one of ordinary skill in the art will recognize that the luminance pump and aspects of identifying manipulations in photos are used in connection with the quasi-color process for producing quasi-color photoluminescent and translucent lithophane of a digitized picture, described above, but which can be embodied in other specific forms without departing from the spirit of the luminance pump and aspects of identifying manipulations in photos. Thus, one of ordinary skill in the art would understand that the luminance pump and aspects of identifying manipulations in photos is not to be limited by the foregoing illustrative details, but rather is to be defined by the appended claims.

V. Authenticity Chip Lithophane that Provides a Powerless Light Reactive Alternative to Electronic Means of Authenticating an Object or an Entry Ticket and an Authenticity Chip Process for Creating an Authenticity Chip Lithophane for Use in Authenticating an Object, an Entry Ticket, or Another Item Some embodiments include an authenticity chip lithophane that provides a powerless light reactive alternate to electronic means of authenticating an object or entry ticket and an authenticity chip process for creating an authenticity chip lithophane.

In some embodiments, the authenticity chip process for creating an authenticity chip lithophane comprises (i) inputting a digitized photo, (ii) loading the digitized photo into a photo manipulation program and adding a white rim, (iii) extruding the digital image, in a 3D modeling program, with light luminance information to create the bottom, copy the extruded digital image and paste it next to the original, mirror the copy to match with the base and to externally complete a smooth box, and then merge the two sides into one object (STL) and save the new 3D model authenticity chip, (iv) loading the authenticity chip STL in the 3D printing slicer program and setting up for printing and saving the gcode file, for putting the gcode in the 3D slicer post processing program and setting up the color changes to create the authenticity chip, and (v) outputting the authenticity chip via the 3D printer.

The authenticity chip process for creating an authenticity chip lithophane of the present disclosure may be comprised of the following elements and steps. This list of possible constituent elements and steps is intended to be exemplary only and it is not intended that this list be used to limit the authenticity chip process for creating an authenticity chip lithophane of the present application to just these elements or steps. Persons having ordinary skill in the art relevant to the present disclosure may understand there to be equivalent elements or steps that may be substituted within the present disclosure without changing the essential function or operation of the authenticity chip process for creating an authenticity chip lithophane.

1. Input digitized photo.
2. Load digitized photo into a photo manipulation program and add white rim (minimum 0.4 mm width minimum) so that when the digital image is extruded by the light luminance information forms solid side walls).
3. In a 3D modeling program, extrude digital image with light luminance information (0.6 mm base 1.5 mm total height) to create the bottom. Then copy the extruded digital image and paste it next to the original. Then mirror the copy so that when it is flipped onto the original extrusion it matches image wise with the base and externally completes a smooth box. Then merge the two sides into one object (STL) and save the new 3D model authenticity chip.
4. In the 3D printing slicer program, load the authenticity chip STL and setup for printing (0.1 resolution, 90% fill, top and bottom solid layers) and save the gcode (3D printing) file. Then put the gcode in the 3D slicer post processing program and setup the color changes to create the authenticity chip. Typically this will be 0.2 mm white plastic, 0.4 mm glow green plastic, from 0.6 mm to 1.2 mm varied colors, 1.2 mm to 1.5 mm clear black to create the view area on top.
5. Output the authenticity chip via the 3D printer.

Figure 17:
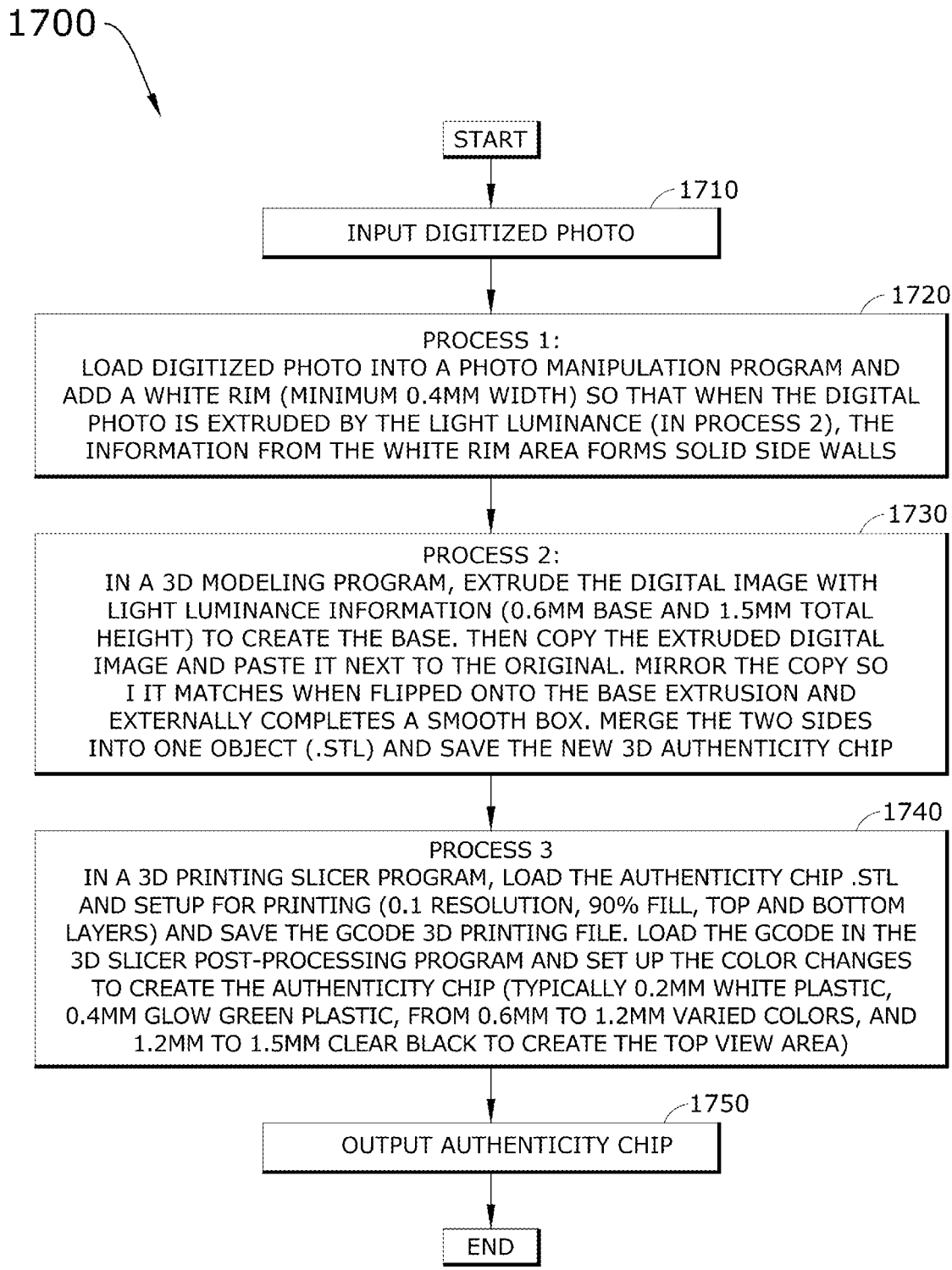
FIG. 17 conceptually illustrates a process for creating an authenticity chip lithophane from a digitized photo in some embodiments.

By way of example, FIG. 17 conceptually illustrates an authenticity chip process for creating an authenticity chip lithophane from a digitized photo 1700. As shown in this figure, the authenticity chip process for creating an authenticity chip lithophane from a digitized photo 1700 starts when a user inputs a digitized photo (at 1710). The digitized photo can be imported from a camera or mobile device, scanned, selected from a local disk drive, or downloaded/retrieved from a cloud storage, cloud database, or other non-local networked resource. In addition, the digitized photo can depict any subject, such as a person, an animal, an object, a landscape, etc.

In some embodiments, the authenticity chip process for creating an authenticity chip lithophane from a digitized photo 1700 performs a first sub-process ("PROCESS 1") by user interaction and operations in a photo manipulation program (at 1720). Specifically, in some embodiments, the user loads the digitized photo into the photo manipulation program and adds a white rim to the digital photo so that, when the digital photo is extruded by the light luminance, the information from the white rim area forms solid side walls. In some embodiments, the white rim is set to a width for the solid side walls. In some embodiments, the width of the white rim is configured to be a minimum of 0.4 MM wide.

In some embodiments, the authenticity chip process for creating an authenticity chip lithophane from a digitized photo 1700 then performs a second sub-process ("PROCESS 2") by which the user interacts with and performs operations in a 3D modeling program (at 1730). Using the 3D modeling program, the user extrudes the digital image (digitized photo) with light luminance information to create a base (base extrusion). Also during the second sub-process, the user copies the extruded digital image in the 3D modeling program and pastes the copied image next to the original extruded digital image. Then the user mirrors the copied image in the 3D modeling program so that that mirrored copy matches when flipped onto the base extrusion and externally completes a smooth box. Still during the second sub-process, the user merges the two sides into one single 3D model (an "STL object") and saves the STL object as the new 3D authenticity chip. In some embodiments, the digital image is extruded with the light luminance information and has a base size and a total height. In some embodiments, the base size is 0.6 mm and the total height is 1.5 mm.

Next, the authenticity chip process for creating an authenticity chip lithophane from a digitized photo 1700 of some embodiments performs a third sub-process ("PROCESS 3") by a 3D slicer program (at 1740). During the third sub-process, the 3D slicer program is used to load the authenticity chip STL object and is configured (set up) for 3D printing. When configured for 3D printing, a 3D print code ("gcode") file is set. In some embodiments, the gcode 3D printing file is saved. Then a 3D slicer post-processing program is used to load the saved gcode and set up color changes to create the authenticity chip lithophane for print output. In some embodiments, the authenticity chip lithophane is set up for print output with 0.2 mm white plastic, 0.4 mm glow green plastic, from 0.6 mm to 1.2 mm varied colors, and from 1.2 mm to 1.5 mm clear black to create the top view area. In some embodiments, the authenticity chip STL object is configured for printing top and bottom layers at 0.1 resolution and 90% fill. An example of an authenticity chip lithophane is described below by reference to FIGS. 18-23.

After completion of the three sub-processes (i.e., PROCESS 1, PROCESS 2, and PROCESS 3), the authenticity chip process for creating an authenticity chip lithophane from a digitized photo 1700 of some embodiments triggers a 3D printer to output the resulting authenticity chip lithophane (at 1750). In some embodiments, after the 3D printer outputs the authenticity chip lithophane, then the authenticity chip process for creating an authenticity chip lithophane from a digitized photo 1700 ends.

Figure 18:
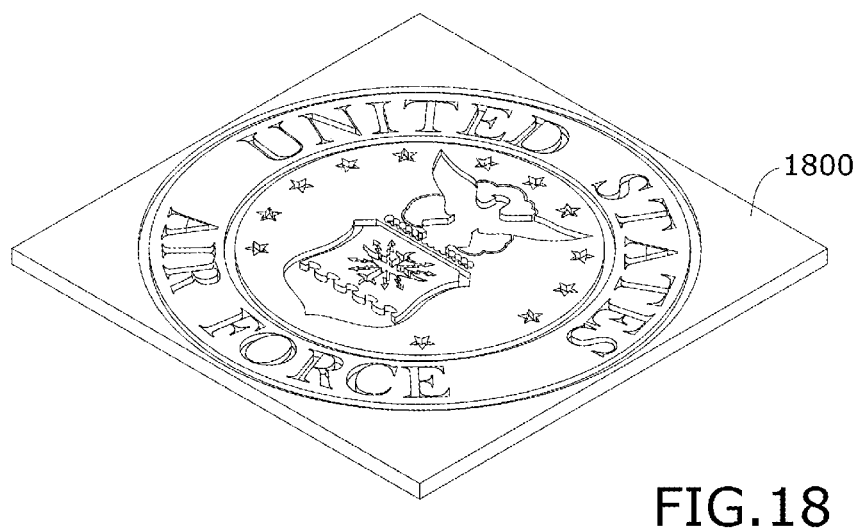
FIG. 18 conceptually illustrates a perspective view of an initial embossing to create a first half of the authenticity chip lithophane.

The authenticity chip process for creating an authenticity chip lithophane from a digitized photo 1700 may be performed to create an authenticity chip lithophane that on the outside is a flat rectangle but has the lithophane embossed internally (light embossed with a white rim to close and create the sides of the box) and create it with a 0.6 mm base 1.5 mm total height, as demonstrated in FIG. 18. Specifically, and by way of example, FIG. 18 conceptually illustrates a perspective view of an initial embossing to create a first half of the authenticity chip lithophane 1800.

Figure 19:
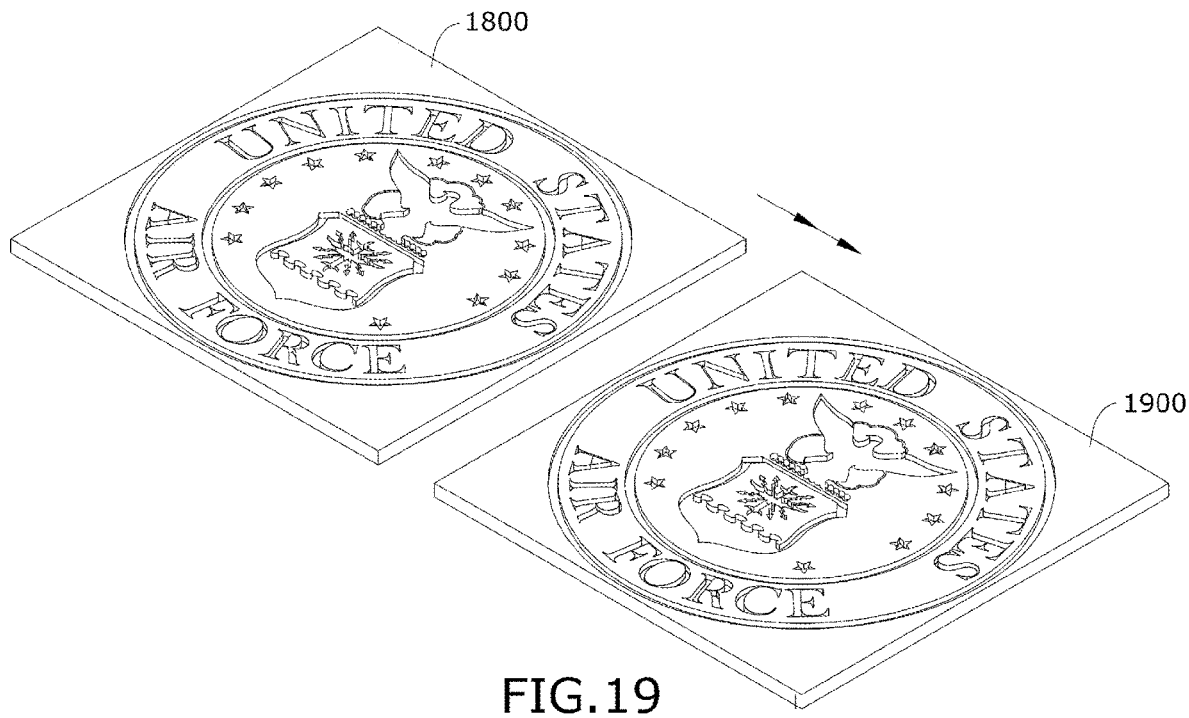
FIG. 19 conceptually illustrates a perspective view of the initial embossed first half of the authenticity chip lithophane also showing a copy.
Figure 20:
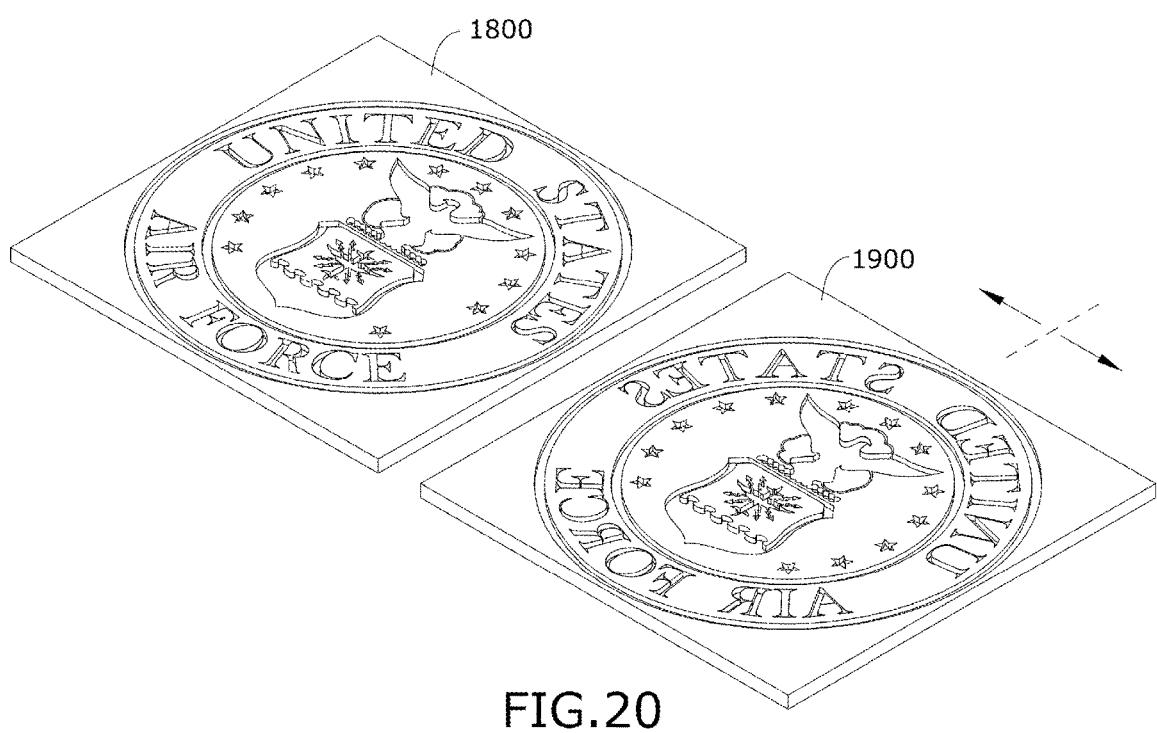
FIG. 20 conceptually illustrates a perspective view of the initial embossed first half of the authenticity chip lithophane unchanged and with the copy mirrored along one axis.

Now turning to another example, FIG. 19 conceptually illustrates a perspective view of the initial embossed first half of the authenticity chip lithophane 1800 also showing a copy 1900. Next, FIG. 20 conceptually illustrates a perspective view of the initial embossed first half of the authenticity chip lithophane 1800 unchanged and with the copy 1900 mirrored along one axis. Specifically, using the modeling program, the user copies the initial embossed first half of the authenticity chip lithophane 1800 and then mirrors the STL for the copy 1900.

Figure 21:
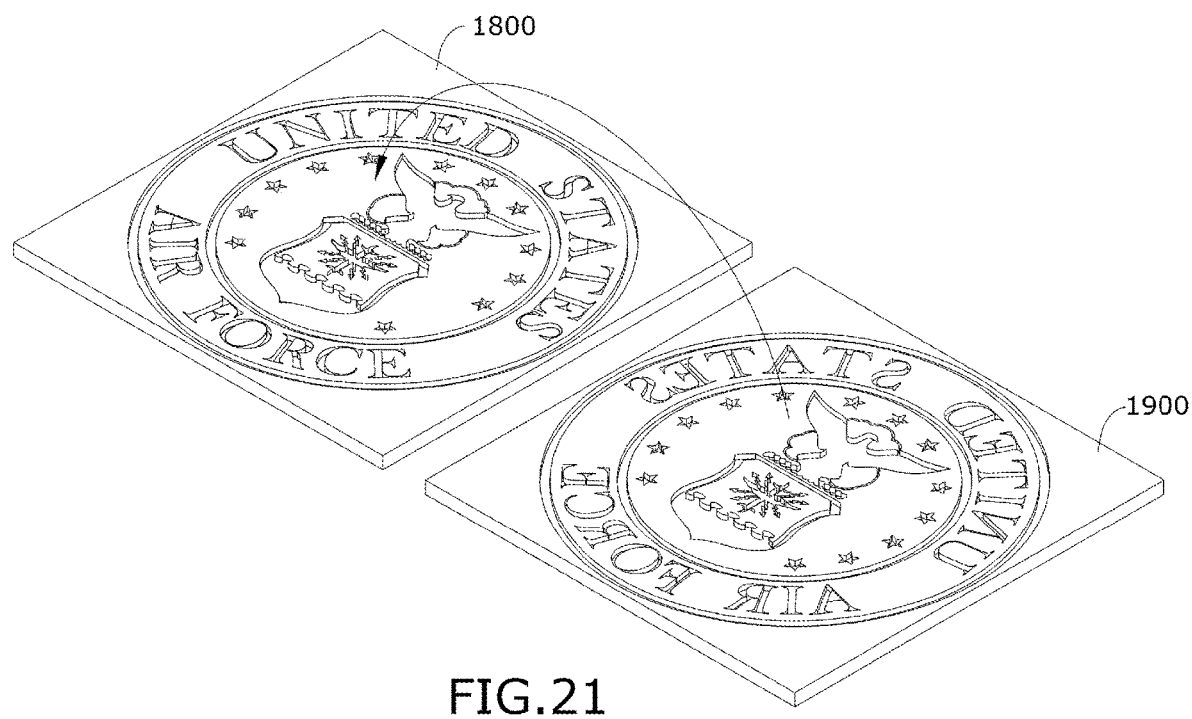
FIG. 21 conceptually illustrates a perspective view of the initial embossed first half of the authenticity chip lithophane unchanged and the mirrored copy flipped and moved into position over an initial half so they will meet correctly when put together.
Figure 22:
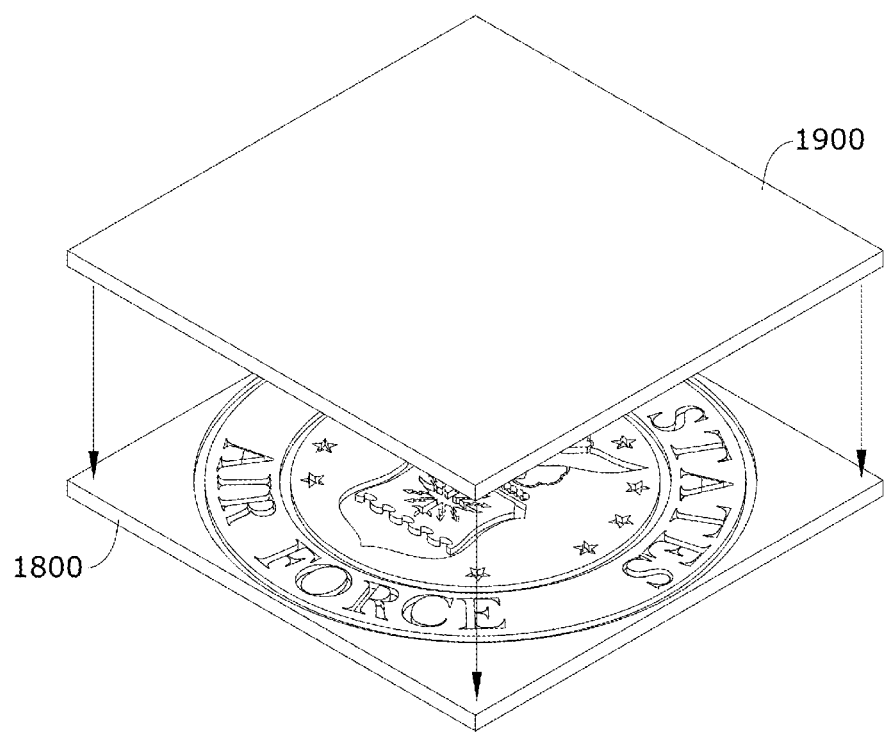
FIG. 22 conceptually illustrates a perspective view of the initial half and the mirrored copy pushed together and merged digitally.
Figure 23:
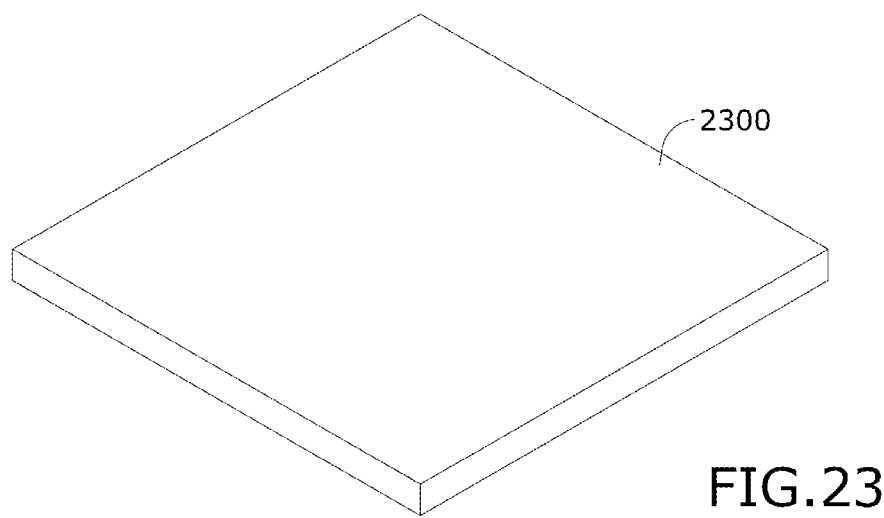
FIG. 23 conceptually illustrates a perspective view of the authenticity chip lithophane after the initial half and the mirrored copy are pushed together and merged digitally.

By way of another example, FIG. 21 conceptually illustrates a perspective view of the initial embossed first half of the authenticity chip lithophane 1800 unchanged and the mirrored copy 1900 flipped and moved into position over an initial half so they will meet correctly when put together. Also, by flipping over the reversed side and placing it so that it will be used to close the box for printing where the data is printed internally and the outside is smooth and can be made dark but still translucent to strong light. By way of example, FIG. 22 conceptually illustrates a perspective view of the initial half 1800 and the mirrored copy 1900 pushed together and merged digitally. The lithophane and rectangle side are merged so the box is sealed when printed, as demonstrated by reference to FIG. 23, which conceptually illustrates a perspective view of the authenticity chip lithophane after the initial half 1800 and the mirrored copy 1900 are pushed together and merged digitally 2300.

In printing it is constructed of different colored PLA plastics starting with a white plastic base, then a few dark translucent colored plastics for coloring of the internal picture, and then ending with both dark translucent black and dark translucent forest green plastics to comprise the dark lens.

The above-described embodiments of the authenticity chip lithophane and the authenticity chip process for creating an authenticity chip lithophane from a digitized photo are presented for purposes of illustration and not of limitation. While these embodiments of the authenticity chip lithophane and the authenticity chip process for creating an authenticity chip lithophane from a digitized photo have been described with reference to numerous specific details, one of ordinary skill in the art will recognize that either the authenticity chip lithophane or the authenticity chip process for creating an authenticity chip lithophane from a digitized photo can be embodied in other specific forms without departing from the spirit of the authenticity chip lithophane or the authenticity chip process for creating an authenticity chip lithophane from a digitized photo. Thus, one of ordinary skill in the art would understand that the authenticity chip lithophane and the authenticity chip process for creating an authenticity chip lithophane from a digitized photo are not to be limited by the foregoing illustrative details, but rather are to be defined by the appended claims.

VI. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" or "program" (as in the 3D modeling program, the 3D slicer program, any 3D slider post-processing program or module, any photo manipulation program, any 3D printer program or 3D printer driver process, etc.) is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 24:
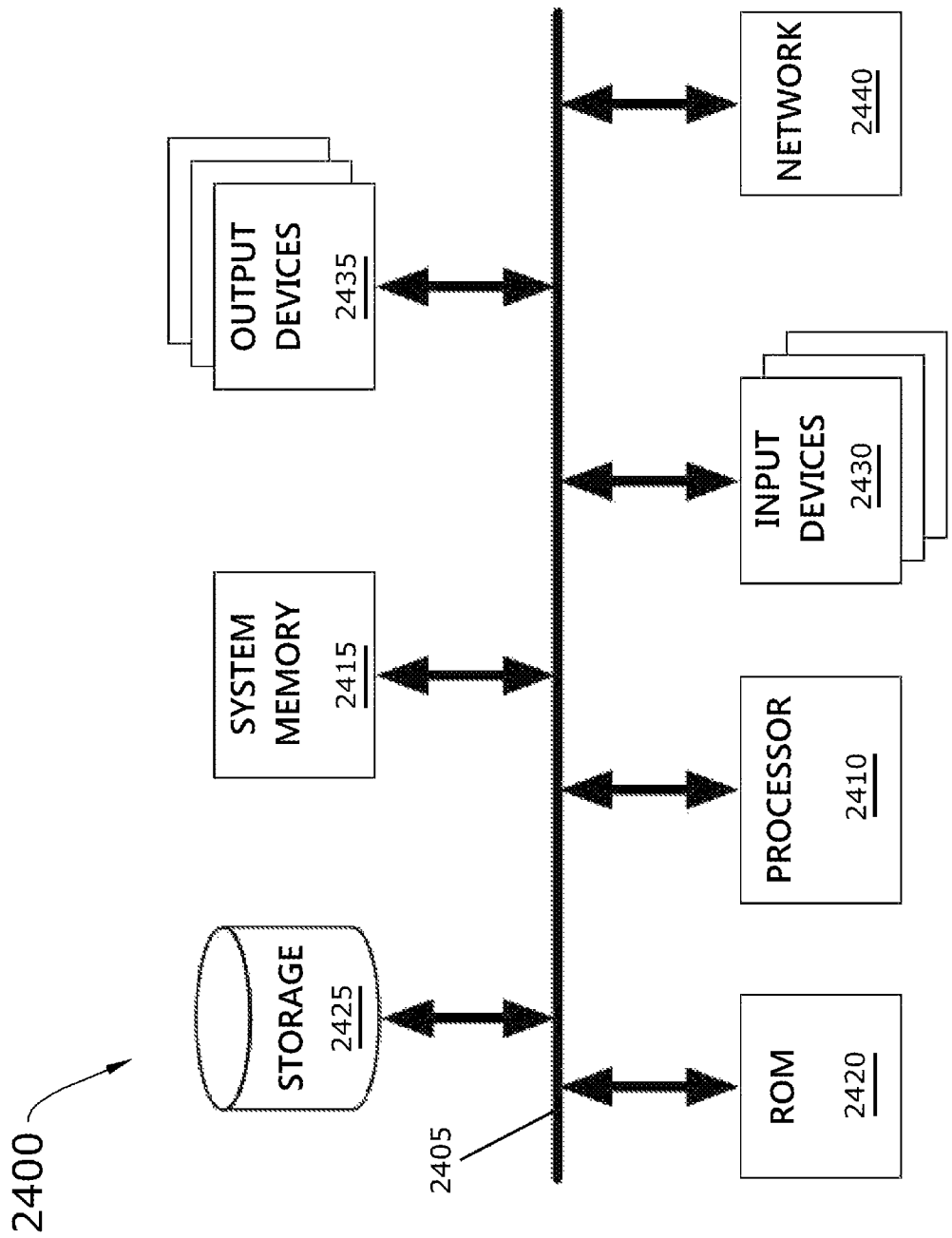
FIG. 24 conceptually illustrates an electronic system with which some embodiments of the invention are implemented.

FIG. 24 conceptually illustrates an electronic system 2400 with which some embodiments of the invention are implemented. The electronic system 2400 may be a computer, phone (cell phone, mobile phone, smartphone, etc.), PDA (iPod, other handheld computing device, etc.), printer (3D printer), or any other sort of electronic device or computing device. Such an electronic system includes various types of computer readable media and interfaces for various other types of computer readable media. Electronic system 2400 includes a bus 2405, processing unit(s) 2410, a system memory 2415, a read-only 2420, a permanent storage device 2425, input devices 2430, output devices 2435, and a network 2440.

The bus 2405 collectively represents all system, peripheral, and chipset buses that communicatively connect the numerous internal devices of the electronic system 2400. For instance, the bus 2405 communicatively connects the processing unit(s) 2410 with the read-only 2420, the system memory 2415, and the permanent storage device 2425.

From these various memory units, the processing unit(s) 2410 retrieves instructions to execute and data to process in order to execute the processes of the invention. The processing unit(s) may be a single processor or a multi-core processor in different embodiments.

The read-only-memory (ROM) 2420 stores static data and instructions that are needed by the processing unit(s) 2410 and other modules of the electronic system. The permanent storage device 2425, on the other hand, is a read-and-write memory device. This device is a non-volatile memory unit that stores instructions and data even when the electronic system 2400 is off. Some embodiments of the invention use a mass-storage device (such as a magnetic or optical disk and its corresponding disk drive) as the permanent storage device 2425.

Other embodiments use a removable storage device (such as a floppy disk or a flash drive) as the permanent storage device 2425. Like the permanent storage device 2425, the system memory 2415 is a read-and-write memory device. However, unlike storage device 2425, the system memory 2415 is a volatile read-and-write memory, such as a random access memory. The system memory 2415 stores some of the instructions and data that the processor needs at runtime. In some embodiments, the invention's processes are stored in the system memory 2415, the permanent storage device 2425, and/or the read-only 2420. For example, the various memory units include instructions for processing appearance alterations of displayable characters in accordance with some embodiments. From these various memory units, the processing unit(s) 2410 retrieves instructions to execute and data to process in order to execute the processes of some embodiments.

The bus 2405 also connects to the input and output devices 2430 and 2435. The input devices enable the user to communicate information and select commands to the electronic system. The input devices 2430 include alphanumeric keyboards and pointing devices (also called "cursor control devices"). The output devices 2435 display images generated by the electronic system 2400. The output devices 2435 include printers and display devices, such as cathode ray tubes (CRT) or liquid crystal displays (LCD). Some embodiments include devices such as a touchscreen that functions as both input and output devices.

Finally, as shown in FIG. 24, bus 2405 also couples electronic system 2400 to a network 2440 through a network adapter (not shown). In this manner, the computer can be a part of a network of computers (such as a local area network ("LAN"), a wide area network ("WAN"), or an intranet), or a network of networks (such as the Internet). Any or all components of electronic system 2400 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 5, 6, 11, and 17 conceptually illustrate processes in which the specific operations of the process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. A quasi-color process for producing quasi-color photoluminescent lithophane of a digitized picture using only luminance information from the digitized picture comprising:

inputting a digitized photo;

dark extruding the digitized photo according to luminance information to obtain dark information of the digitized photo;

saving the dark extrusion as a 3D model;

configuring printing parameters of the dark extrusion 3D model via a 3D printing slicer program and outputting a gcode file in response to the configured printing parameters for a printing by a 3D printer;

updating the gcode file during material post processing stage that sets lithophane color heights to create the quasi-color effect by a quasi-color formula that stacks a plurality of colored layers from bottom to top of a total lithophane height with a white color layer at the bottom, a green color layer atop the white color layer, a lower blue color layer atop the green color layer, a lower red color layer atop the lower blue color layer, a middle blue color layer atop the lower red color layer, an upper red color layer atop the middle blue color layer, and a top blue color layer at the top and stacked above the upper red color layer, wherein the quasi-color formula comprises a five percent white color layer height of the total lithophane height, a nineteen percent green color layer height of the total lithophane height, a ten percent lower blue color layer height of the total lithophane height, a sixteen percent lower red color layer height of the total lithophane height, a ten percent middle blue color layer height of the total lithophane height, a sixteen percent upper red color layer height of the total lithophane height, and a twenty-one percent top blue color layer height of the total lithophane height; and using the updated gcode file by the 3D printer to produce the quasi-color photoluminescent lithophane.

2. The quasi-color process of claim 1, wherein the dark information is used as an extruded height for the 3D model of the digitized photo.

3. The quasi-color process of claim 1, wherein the printing parameters comprise a position, an infill density, and a layer height.

4. A quasi-color process for producing quasi-color photoluminescent lithophane of a digitized picture using only luminance information from the digitized picture comprising:
- inputting a digitized photo;
- dark extruding the digitized photo according to luminance information to obtain dark information of the digitized photo;
- saving the dark extrusion as a 3D model;
- configuring printing parameters of the dark extrusion 3D model via a 3D printing slicer program and outputting a gcode file in response to the configured printing parameters for a printing by a 3D printer;
- updating the gcode file during material post processing stage that sets lithophane color heights to create the quasi-color effect by stacking a plurality of colored layers according to a quasi-color formula that specifies a five percent white color layer height of a total lithophane height, a nineteen percent green color layer height of the total lithophane height, a ten percent lower blue color layer height of the total lithophane height, a sixteen percent lower red color layer height of the total lithophane height, a ten percent middle blue color layer height of the total lithophane height, a sixteen percent upper red color layer height of the total lithophane height, and a twenty-one percent top blue color layer height of the total lithophane height; and
- using the updated gcode file by the 3D printer to produce the quasi-color photoluminescent lithophane.

5. The quasi-color process of claim 4, wherein the dark information is used as an extruded height for the 3D model of the digitized photo.

6. The quasi-color process of claim 4, wherein the printing parameters comprise a position, an infill density, and a layer height.

* * * * *